United States Patent [19]

Condron et al.

[11] Patent Number: 5,105,843
[45] Date of Patent: Apr. 21, 1992

[54] ISOCENTRIC LOW TURBULENCE INJECTOR

[75] Inventors: James A. Condron, Hurricane; Alex C. Kuo, Charleston, both of W. Va.

[73] Assignee: Union Carbide Chemicals & Plastics Technology Corporation, Danbury, Conn.

[21] Appl. No.: 676,512

[22] Filed: Mar. 28, 1991

[51] Int. Cl.$^5$ ............................................. F17D 1/17
[52] U.S. Cl. ................................... 137/13; 137/602; 137/889
[58] Field of Search .................. 137/13, 888, 889, 896, 137/897, 268, 892, 893, 894, 895, 602, 605

[56] References Cited

U.S. PATENT DOCUMENTS

| | | | |
|---|---|---|---|
| 2,899,374 | 8/1959 | Gomory | 137/896 X |
| 3,502,103 | 3/1970 | Verschuur | 137/13 X |
| 3,735,778 | 5/1973 | Garnier | 137/896 |
| 4,124,528 | 11/1978 | Modell | 252/411 |
| 4,189,914 | 2/1980 | Marek et al. | 60/726 |
| 4,326,560 | 4/1982 | Drudy | 137/896 |
| 4,375,387 | 3/1983 | deFilippi et al. | 202/169 |
| 4,526,584 | 7/1985 | Funk | 137/13 X |
| 4,546,612 | 10/1985 | Santhanam | 137/13 X |
| 4,582,731 | 4/1986 | Smith | 427/421 |
| 4,619,735 | 10/1986 | Norton | 162/135 |
| 4,734,227 | 3/1988 | Smith | 264/13 |
| 4,734,451 | 3/1988 | Smith | 524/493 |
| 4,737,384 | 4/1988 | Murthy et al. | 427/369 |
| 4,745,937 | 5/1988 | Zagustin et al. | 137/13 |
| 4,923,720 | 5/1990 | Lee | 427/422 |

FOREIGN PATENT DOCUMENTS

| | | |
|---|---|---|
| 2603664 | 8/1977 | Fed. Rep. of Germany . |
| 2853066 | 6/1980 | Fed. Rep. of Germany . |
| 84328 | 6/1980 | Japan . |
| 168674 | 10/1983 | Japan . |
| 16703 | 1/1984 | Japan . |
| 152505 | 7/1987 | Japan . |
| 868051 | 4/1988 | South Africa . |

OTHER PUBLICATIONS

Francis, A. W., "Ternary Systems of Liquid Carbon Dioxide", J. Phys. Chem. 58:1099, Dec. 1954.
Smith, R. D., et al., "Direct Fluid Injection Interface for Capillary Supercritical Fluid Chromatography-Mass Spectrometry", J. Chromatog. 247 (1982):231–243.
Krukonis, V., "Supercritical Fluid Nucleation of Difficult-to-Continue Solids", paper presented at 1984 Annual Meeting, AICHE, San Francisco, Calif., Nov. 25–30, 1984.
Dandage, D. K., et al., "Structure Solubility Correlations: Organic Compounds and Dense Carbon Dioxide Binary Systems", Ind. Eng. Chem. Prod. Res. Dev. 24: 162–166 (1985).
Matson, D. W., et al., "Production of Powders and Films by the Rapid Expansion of Supercritical Solutions", J. Materials Science 22: 1919–1928 (1987).
McHugh, M. A. et al., "Supercritical Fluid Extraction, Principles and Practice", Butterworth Publishers (1986) Contents and Append.
Cobbs, W. et al., "High Solids Coatings Above 80% By Volume", Water-Borne & High Solids Coatings Symposium, Mar. 1980.
Matson, D. W. et al., "Production of Fine Powders by the Rapid Expansion of Supercritical Fluid Solutions", Advances in Ceramics vol. 21, pp. 109–121 (1987).
Kitamura, Y., et al., "Critical Superheat for Flashing of Superheated Liquid Jets", Ind. Eng. Chem. Fund. 25: 206–211 (1986).
Petersen, R. C. et al., "The Formation of Polymer Fibers From the Rapid Expansion of SCF Solutions", Pol. Eng. & Sci. (1987) vol. 27, p. 16.

*Primary Examiner*—Stephen M. Hepperle
*Attorney, Agent, or Firm*—Morris N. Reinisch

[57] ABSTRACT

The present invention is directed to improved methods and apparatus for adding one or more fluids to another while substantially preventing the precipitation of one or more dissolved solids contained within a first fluid when being added to a second fluid containing at least one non-solvent component for the one or more dissolved solids.

55 Claims, 8 Drawing Sheets

ISOCENTRIC LOW TURBULENCE INJECTOR

RELATED PATENT APPLICATIONS

This application contains subject matter related to application Ser. No. 418,820, filed Oct. 4, 1989, now U.S. Pat. No. 4,923,720, issued May 8, 1990. This application also contains subject matter related to U.S. patent applications Ser. No. 218,896, filed Jul. 14, 1988; Ser. No. 218,910, filed Jul. 14, 1988; Ser. No. 327,274, filed Mar. 22, 1989; and Ser. No. 413,517, filed Sep. 27, 1989, the contents of which are all incorporated herein by reference as if set out in full.

FIELD OF THE INVENTION

This invention, in its more broader embodiment, pertains to the field of effectively mixing a proportionated plurality of fluids, particularly compressible and non-compressible fluids, more particularly coating compositions and supercritical fluids which are used as viscosity reducing diluents. More specifically, the present invention, is directed to improved methods and apparatus for forming a completely mixed, sprayable coating composition mixture while substantially avoiding undesirable precipitation of solids and consequential system plugging. The resultant admixed properly proportioned fluid mixture can then be sprayed onto a substrate to form the desired coated product.

BACKGROUND OF THE INVENTION

In essentially every process in which a mixture is prepared for a particular purpose, the constituents of that mixture usually need to be present in particularly, proportioned amounts in order for the mixture to be effective for its intended use. In the aforementioned related patent applications, the underlying objective is to reduce the amount of organic solvent present in a coating composition by the use of supercritical fluid, particularly, carbon dioxide. Understandably, with this objective in mind, it is generally desirable to utilize as much supercritical fluid as possible while still retaining the ability to effectively spray the liquid mixture of coating composition and supercritical fluid and also obtain a desirable coating on the substrate. Accordingly, here too, it is particularly preferred that there be prescribed, proportionated amounts of supercritical fluid and of coating composition present in the liquid admixed coating formulation to be sprayed.

Generally, the preferred upper limit of supercritical fluid addition is that which is capable of being miscible with the coating composition. This practical upper limit is generally recognizable when the admixture containing coating composition and supercritical fluid breaks down from one phase into two fluid phases.

To better understand this phenomenon, reference is made to the phase diagram in FIG. 1 wherein the supercritical fluid is supercritical carbon dioxide fluid. In FIG. 1, the vertices of the triangular diagram represent the pure components of an admixed coating formulation which for the purpose of this discussion contains no water. Vertex A is solvent, vertex B is carbon dioxide and vertex C represent a polymeric material. It can be clearly seen in this Figure that the polymer and the solvent are completely miscible in all proportions, that the carbon dioxide and the solvent are likewise completely miscible in all proportions, but that the carbon dioxide and the polymer are not miscible in any proportion, and as such is a non-solvent for the polymer. The curved line BFC represents the phase boundary between one phase and two Phases. The point D represents a possible composition of a coating composition in which supercritical carbon dioxide has not been added. The point E represents a possible composition of an admixed coating formulation after admixture with supercritical carbon dioxide. The addition of supercritical carbon dioxide fluid has reduced the viscosity of the viscous coating composition to a range where it can be readily atomized by passing it through an orifice such as in an airless spray gun. After atomization, a majority of the carbon dioxide vaporizes, leaving substantially the composition of the original viscous coating composition. Upon contacting the substrate, the remaining liquid mixture of the polymer and solvent component(s) will flow, i.e., coalesce, to produce a uniform, smooth film on the substrate. The film forming pathway is illustrated in FIG. 1 by the line segments EE'D (atomization and decompression) and DC (coalescence and film formation).

The amount of supercritical fluid, such as supercritical carbon dioxide, that can be mixed with a coating composition is generally a function of the miscibility of the supercritical fluid with the coating composition as can best be visualized by referring to FIG. 1.

As can be seen from the phase diagram, particularly as shown by arrow 100, as more and more supercritical carbon dioxide is added to the coating formulation, the compositions of the liquid admixed coating mixture approaches the two-phase boundary represented by line BFC. If enough supercritical carbon dioxide is added, the two-phase region is reached and the composition correspondingly breaks down into two fluid phases. Sometimes, it may be desirable to admix an amount of supercritical fluid which is even beyond the two phase boundary. Generally, however, it is not preferable to go much beyond this two phase boundary for optimum spraying performance and/or coating formation.

In addition to avoiding the two-phase state of the supercritical fluid and the coating composition, proper proportionation is also desirable to provide optimum spraying conditions, such as, formation of desired admixed viscosity, formation of desired particle size, formation of desired sprayed fan shape, and the like.

Accordingly, in order to spray liquid admixed coating formulations containing supercritical fluid as a diluent on a continuous, semi-continuous, and/or an intermittent or periodic on-demand basis, it is necessary to prepare such liquid admixed coating formulations in response to such spraying by accurately mixing a proportioned amount of the coating composition with the supercritical fluid. However, the compressibility of supercritical fluids is much greater than that of liquids. Consequently, a small change in pressure or temperature results in large changes in the density of the supercritical fluid.

The compressibility of the supercritical fluids causes the flow of these materials, through a conduit and/or pump, to fluctuate. As a result, when mixed with the coating composition, the proportion of supercritical fluid in the resulting admixed coating formulation also correspondingly fluctuates instead of being uniform and constant. Moreover, the compressibility of liquid carbon dioxide at ambient temperature is high enough to cause flow fluctuations to occur when using reciprocating pumps to pump and proportion the carbon dioxide with the coating composition to form the admixed coating formulation. This particularly occurs when the volume of liquid carbon dioxide in the flow path between the pump and the mixing point with the coating composition is too large. The fluctuation can be promoted or accentuated by any pressure variation that occurs during the reciprocating pump cycle.

In an embodiment discussed in a number of the aforementioned related patent applications, (U.S. application Ser. Nos. 218,896 and 218,910) an apparatus is disclosed for pumping and proportionating a non-compressible fluid, e.g., a coating composition, with a compressible fluid, e.g., liquid carbon dioxide, in order to prepare the ultimate mixture to be sprayed comprised of the coating composition and the carbon dioxide in its supercritical state. In that embodiment, volumetric proportionating of the coating composition stream and the liquid carbon dioxide stream is carried out by means of reciprocating pumps which displace a volume of fluid from the pump during each one of its pumping cycles. One reciprocating pump is used to pump the coating composition which is slaved to another reciprocating pump which is used to pump the liquid carbon dioxide. The piston rods for each pump are attached to opposite ends of a shaft that pivots up and down on a center fulcrum. The volume ratio is varied by sliding one pump along the shaft, which changes the stroke length.

However, since liquid carbon dioxide is relatively compressible at ambient temperature (the temperature at which it is typically stored in a pressurized container), such compressibility may undesirably cause fluctuations and oscillations of the amount of carbon dioxide that is present in the admixed coating formulation that is to be sprayed. This occurs due to the incompatible pumping characteristics of relatively non-compressible coating composition and relatively compressible liquid carbon dioxide. With the coating composition, pressure is immediately generated in the reciprocating pump as soon as its volume is displaced. Inasmuch as the liquid carbon dioxide is substantially compressible, a larger volume is needed to be displaced in order to generated the same pressure. Because mixing occurs when the flow of the coating composition and of the liquid carbon dioxide occurs in the mixing manifold at the same pressure, the flow rate of carbon dioxide lags behind the flow rate of the coating composition.

This fluctuation is accentuated if the driving force operating the pump varies during the operating cycle, such as an air motor changing direction during its cycle. Thus, if the driving force declines, the pressure in the coating composition flow declines even more rapidly, due to its non-compressibility, than the pressure in the liquid carbon dioxide flow, due to its being compressible.

Accordingly, the pressures generated in both flows may be out of phase during the pumping cycle, such that the proportion of carbon dioxide in the mixture to be sprayed also varies. This fluctuation is made even more severe if cavitation also occurs in the carbon dioxide pump due to vapor formation as the pump fills.

While some of these fluctuations and problems have been suppressed by refrigerating the liquid carbon dioxide to low temperatures such as below 10° C., and even below 0° C., prior to its entering the reciprocating pump, a need still existed to avoid substantially all inaccuracies that may be present in the proportionation of the non-compressible coating composition and the compressible liquid carbon dioxide to form the desired admixture. Indeed, a need existed to provide a means to accurately proportion any compressible fluid with a non-compressible fluid.

That need was met in the aforementioned related patent application, U.S. patent application Ser. No. 413,517, filed Sep. 27, 1989, wherein apparatus and methods are disclosed for accurately and continuously providing a proportioned mixture comprised of non-compressible fluid and compressible fluid, relying particularly upon mass proportionation.

Generally, the apparatus disclosed in U.S. patent application Ser. No. 413,517 comprises:

a) means for supplying substantially compressible fluid;

b) means for measuring the mass flow rate of the substantially compressible fluid;

c) means for generating a signal in response to the measured mass flow rate of the substantially compressible fluid;

d) means for supplying substantially non-compressible fluid;

e) means for controlling the flow rate of the substantially non-compressible fluid responsive to the signal generated in (c);

f) means for forming a mixture of the measured compressible fluid and the controlled non-compressible fluid; and g) means for circulation in which the mixture is introduced containing:
  i) a heating means for heating the mixture to a temperature wherein the compressible fluid is in the supercritical state;
  ii) a positive displacement pump for circulating the mixture;
  iii) an accumulator;
  iv) a static mixer;
  v) a density meter; and
  vi) a spraying means.

The broadest method disclosed in that application for forming a mixture of a substantially compressible fluid and a substantially non-compressible fluid in a predetermined proportion includes:

a) supplying substantially compressible fluid;

b) measuring the mass flow rate of the substantially compressible fluid;

c) generating a signal in response to the measured mass flow rate of the substantially compressible fluid;

d) supplying substantially non-compressible fluid;

e) controlling the flow rate of the substantially non-compressible fluid responsive to the signal generated in (c);

f) forming a mixture of the measured compressible fluid and the controlled non-compressible fluid; and g) introducing the mixture to a circulation loop in which the mixture is heated to a temperature above the critical temperature of the compressible fluid wherein the compressible fluid enters its supercritical state to form the mixture of non-compressible fluid and supercritical compressible fluid in a predetermined proportion.

As used in that application and as used herein the phrase "compressible fluid" is meant to include a material whose density is affected by a change in pressure to an extent of at least about 2 percent.

Specifically, as discussed in application Ser. No. 413,517, the mass flow rate of the compressible fluid is continuously and instantaneously measured. Regardless of what that flow rate is and whether or not it is fluctuating as a result of, for example, being pumped by a reciprocating pump or regardless of the state in which such compressible fluid is in, that mass flow rate information is fed to a signal processor on a continuous and instantaneous manner. Based on that received information, the signal processor in response to the amount of compressible fluid that has been measured, controls a metering device which controls the rate of flow of the non-compressible fluid. The non-compressible fluid is metered in a precise, predetermined proportion relative to the compressible fluid flow rate such that when the compressible and non-compressible fluids are subsequently mixed in the mixing manifold, they are present in the admixed coating formulation in the proper proportions.

By measuring the mass flow rate of the substantially compressible fluid, and then controlling the amount of non-compressible fluid in response thereto, the problems associated with phase changes of the compressible fluid, such as vaporization or condensation, are substantially eliminated. Any fluctuations or oscillations present in the flow of the compressible fluid are instantaneously measured and are compensated by controlling the amount of non-compressible fluid to provide the prescribed proportionation for the desired mixture. In contrast to past techniques, this embodiment involves the metering, i.e., controlling the flow rate, of only one fluid, namely, the non-compressible fluid. The flow rate of the compressible fluid is not controlled, but rather only measured, from which measurement the prescribed amount of non-compressible fluid is correspondingly adjusted to provide the desired proportionation. This allows for total flexibility of the system and provides for simple and effective means for producing the desired proportioned mixture of compressible and non-compressible fluids.

The apparatus and methods disclosed in application Ser. No. 413,517 are particularly effective and specifically focused for producing the desired proportionated mixture of compressible and non-compressible fluids on a relatively large scale, continuous basis. The suitability of the inventions disclosed in that Application is demonstrated most clearly by the Examples included in said Application wherein trouble-free operation was sustained as indicated by observation of the sight glass in the circulation loop of single-phase admixtures of coating composition and the compressible fluid, such as carbon dioxide, and by the subsequent successful spraying onto the substrate such that coatings with the desired properties being obtained.

In those Examples, the compressible fluid used was carbon dioxide, while the non- compressible fluid, the coating composition, consisted of one or more polymers and resins selected from a group including Rohm & Haas Acryloid TM AT-400 resin (an acrylic polymer dissolved in methyl amyl ketone solvent), American Cyanamid Cymel TM 323 resin (a melamine polymer dissolved in isobutanol solvent), Rohm & Haas Acryloid TM AT-954 resin (another acrylic polymer dissolved in methyl amyl ketone solvent), Rohm & Haas Acryloid TM B-66 resin (an acrylic polymer dissolved in methyl amyl ketone solvent), Spencer Kellog Aroplaz TM 6025-A6-80 resin (a polyester polymer dissolved in methyl PROPASOL TM acetate), Eastman Chemical cellulose acetate butyrate (a solid very high molecular weight polymer dissolvable in methyl amyl ketone solvent), Dow polystyrene polymer, Du Pont Centari TM Acrylic Enamel B8292A Medium Blue Metallic Auto Refinish Paint, a mixture of an alkyd resin, an acrylic resin, and a polyester resin dissolved in a mixed solvent containing xylene, methyl isobutyl ketone, and mineral spirits, and Eastman Chemical Cellulose Ester CAB-381-0.1.

As in application Ser. No. 413,517, in application Ser. No. 218,910, the effectiveness of the mixing point device, a commercially available Swagelok TM tubing tee fitting with a 5000-psi pressure rating which combines the coating composition and the supercritical fluid and conveys the admixture into a static mixer and then into the circular loop, was demonstrated by the Examples that were set forth wherein increasing the supercritical fluid (carbon dioxide) concentration to the solubility limit (a trace of fine bubbles appears in the circulation loop sight glass) and beyond did not result in the malfunctioning of the apparatus; although, in the latter case such operation in the two-phase region resulted in lower quality coatings. In these Examples, the Rohm & Haas Acryloid TM resins and American Cyanamid Cymel TM 323 resin were primarily used. Similarly, in other Examples of the application Ser. No. 218,910, dependable apparatus operation was experienced even when the admixed coating formulations contained suspended solids such as metallic flakes or white titanium dioxide pigment.

Furthermore, the effectiveness of the mixing manifold and the circulation loop apparatus and method was demonstrated by the Examples included in aforementioned U.S. patent application Ser. No. 327,274, wherein generally water was utilized to replace organic solvent present in a precursor composition including Cargill 7451 (a water-reducible tall oil fatty acid alkyd resin in butoxy ethanol solvent) and American Cyanamid Cymel TM 303 resin until the two-phase region was reached. In some cases substantial clouding of the solution developed, which indicated precipitation of polymer or resin beginning to occur, resulting in phase separation without affecting the spraying performance of those compositions nor the apparatus being utilized. When the resin was changed to Cargill 7203 (a water-reducible oil free polyester resin supplied in a 2-butanol:butoxy ethanol solvent system), similar results were obtained. In all of the cases where two-phases occurred, it was evidenced that the resulting phenomenon was the dispersement of the less viscous fluid as bubbles or particles in the more viscous fluid.

Thus, even under conditions in which two phases were obtained by design, it is clear from the foregoing discussion that the apparatus and methods disclosed in the embodiments of the aforementioned related applications were effectively supplying, feeding, measuring, proportioning, mixing, pressurizing, heating, and spraying an admixed coating formulation consisting of an admixture of a non-compressible coating composition comprised of one or more high solids resin or polymer selected from a substantial list comprised of acrylics, amino, polyesters, alkyds, a variety of organic solvents, including water in some instances; suspended solids such as metallic flakes and other pigments; and a compressible supercritical fluid, such as supercritical carbon dioxide, as a viscosity reducing diluent.

Unexpectedly, however, we experienced operating problems when a nitrocellulose lacquer based coating composition was used with the methods and apparatus disclosed in the preferred embodiments of the of aforementioned Applications. For reasons not fully understood with this coating composition, precipitation of solids occurred at the carbon dioxide injection and mixing point resulting in apparatus plugging; prior operation of the apparatus with the aforementioned acrylic and other polymer systems in said apparatus showed no evidence of such problems, even when some precipitation occurred.

After several runs with the nitrocellulose lacquer based coating composition, inspection of the apparatus revealed that the precipitate, in the form of a solid, partially to fully plugged the carbon dioxide 180° mixing tee, followed by additional plugging through the accumulation of said solids in the downstream static mixer connected to the injection point device.

As used herein and as is conventionally used in the art, a "180° mixing tee" is defined as a pipe or tubing tee in which two fluids are introduced opposing each other in the run of the tee with mixed flow exiting through the branch of the tee. On the other hand, a "90° mixing tee" is defined as a pipe or tubing tee in which one of the fluids is introduced through the branch of the tee to mix with the primary flow in the run of the tee with the mixture exiting through the run of the tee.

Mixing tees are well known to those skilled in the art as a device to provide the mixing of two fluid streams provided pressure losses and mixing distances are not excessive. The purpose of said device is to quickly mix two streams. The results of studies of the functioning of such devices are available in the literature and, in general, show that the turbulence induced as two relatively non-viscous streams are brought together, either in opposition or at right angles, produces rapid mixing. By virtue of the said turbulence generated, mixing tees are normally considered to be turbulent mixers.

In our prior experience, when polymer or resin precipitated due to the planned or accidental addition of too much carbon dioxide, or perhaps due to the coating admixture infringing the two-phase region for one reason or another, or when finely divided solid particles were suspended in the admixture as part of the coating composition, we found no such gel formation nor experienced any observable plugging of the apparatus. Therefore, from a fluid dynamic standpoint, it appeared that the methods and apparatus of the aforementioned inventions heretofore employed comprised an effective system for achieving all operational objectives.

Without wishing to be bound by theory, we believe that the action associated with turbulence connected with the introduction and mixing of a polymer containing fluid and the supercritical carbon dioxide fluid within a mixing tee resuls in a condition wherein relatively large bubbles, plugs, or slugs, or even stratified flow patterns occur, wherein pure or relatively pure liquid supercritical carbon dioxide comes into contact at the liquid-liquid interface with the laminar layer of the polymer material admixture in contact with the tubing tee wall, such that the composition of said wall admixture, particularly at the liquid-liquid interface, is ever changing and eventually reaches a state wherein the polymer component precipitates once the two-phase region (as shown in FIG. 1 as bounded by line BFC) is reached and penetrated. This causes precipitation which results in the formation and growth of films and particles on the tee walls, eventually reaching a magnitude such that the tee becomes completely plugged. At the same time, other particles apparently slough off the growing solids mass and flow downstream causing plugging in other downstream devices of the apparatus. We also believe, and still not wishing to be bound by theory, that other aggregates of pure carbon dioxide in the mainstream may act upon aggregates of polymer solution causing localized precipitation and the development of particles in the flowing fluid.

Referring again to FIG. 1, when two phases occur, they are in equilibrium, with said equilibrium established by a series of tie lines (not shown in FIG. 1) spanning line BFC, and generally being somewhat reasonably parallel to the base line BC with the slope (increasing from side AB towards side AC of the triangle) of said tie lines changing as the infinite series of tie lines extending from the curve segment BF proceeding towards the critical point F. As can be seen in FIG. 1, if one were to extend line EE'D to intersect the FC segment of the equilibrium cure BFC, this Phase contains, and this is the usual case, a moderate amount of polymer and about a one-to-one ratio of solvent and non-solvent, which would vary, of course, from example to example, and the material of this composition is a swollen polymer, which can be a gel. On the other hand, the other phase, which would intersect segment BF of the equilibrium curve, nearer F than B in this case, is usually practically pure liquid, particularly when one branch of the binodal (curve segment BF in our case) is very close to the solvent-non-solvent side of the triangle, except, of course, near the critical point F. Generally, the solvent-non-solvent composition is usually very different in the two phases.

Because of its importance, a brief discussion of fluid mechanics principles is warranted. Without wishing to be bound by theory, in the single-phase flow of Newtonian fluids in circular conduits, flow velocity varies within the conduit due to the shear-stress distribution. For a uniform flow, the shear stress will be zero at the center and increase linearly to a maximum at the conduit wall. For laminar flow in a circular conduit, this shear-stress force distribution causes a parabolic velocity profile across the cross-section of the conduit with the maximum velocity at the center of the conduit. The layer of fluid near the solid surface of the conduit, the liquid-solid interface, wherein the change of velocity occurs due to the shear stress at said surface, is termed the "boundary layer" and for a laminar boundary layer its thickness is inversely proportional to the Reynolds number, based on the free-stream velocity. Therefore, because of the effect of the viscosity term upon the Reynolds number, the boundary layer thickness is larger for high viscosity fluids flowing at low velocities. Of course, at the conduit wall the velocity is zero, and material adjacent to said wall does not move, except by diffusional forces which are relatively small. Moreover, because of these conditions, with a high viscosity fluid such as in the present case, a relatively thick layer of relatively unmoving material exists at the conduit wall. When non-Newtonian fluids in laminar flow are considered, similar behavior is experienced; except that for pseudoplastic materials such as polymeric solutions or melts, the shear stress is no longer a linear function of the shear rate, but in general is a logarithmic function. However, the transition from laminar to turbulent flow occurs at approximately the same Reynolds number.

For the case of a turbulent boundary layer, however, the layer has three zones. The zone immediately adjacent to the surface of the conduit is a layer of fluid, which because of the damping effect of the conduit surface, remains relatively smooth although most of the flow in the boundary layer is turbulent. This very thin layer is termed the "viscous sublayer" and its thickness is a direct function of viscosity and an inverse function of the shear velocity at the conduit surface. For high velocity flow, therefore, the viscous sublayer thickness will be small. The flow zones outside of this sublayer are turbulent wherein the mixing action of turbulence causes small fluid masses to be swept back and forth in a direction normal to the mean flow direction. Consequently, primarily a momentum-exchange phenomenon is effected as fluid is swept from one zone to another.

For purposes of the present discussion, "turbulent flow" is characterized by mixing action throughout the flow field that is caused by eddies of varying size within said flow field. "Laminar flow", on the other hand, is lacking the strong mixing phenomena and eddies common to turbulent flow. Therefore, the flow has a very smooth aspect. For the case of laminar flow in a straight circular conduit, as previously discussed, the velocity distribution is parabolic, and at any given distance from the conduit wall the velocity will be constant with respect to time. In the turbulent-flow case, two effects are apparent. First, because the flow is thoroughly mixed due to the eddies, the velocity distribution is more uniform than in the laminar-flow case. This occurs because the turbulent mixing process transports the low-velocity fluid near the wall towards the center, and the higher-velocity fluid in the central region is transported toward the wall. The second effect of turbulence is to continuously add fluctuating components of velocity to the flow field. At any instance of time the distribution of the velocity component in the axial direction of flow is, therefore, irregular. Accordingly, the velocity varies with time, and the flow is termed unsteady. However, for the average mean velocity with respect to time at a given point taken over a relatively long time period, the velocity is practically constant and the flow is termed steady.

Further complicating the understanding of the fluid dynamics occurring as carbon dioxide and coating material liquids are merging, is the existence of two-phase flow. Very little experimental work has been done, as reported in the literature, on liquid-liquid, two-component isothermal flow in circular conduit systems. Most of the known work reported concerns liquid-gas systems, liquid-solids systems, and solids-gas systems. What work that has been done on the liquid-liquid system has concentrated around the understanding of the two-component flow of the immiscible system of oil and water. For a nearly equal density oil-water system, the flow patterns are very similar to those described for liquid-gas flow, i.e., bubble, plug, stratified, wavy, slug, annular, and spray flow. For bubble and slug flow, bubbles or slugs of the more viscous liquid occur in the less viscous fluid phase. For the stratified flow regime, the less viscous fluid phase becomes a concentric annular flow around a core of the more viscous fluid. When the velocities of the two fluids are relatively low, less than about 2 feet per second, apparently only bubble, plug or stratified flow patterns occur; wherein the regime which prevails is dependent upon the ratio of their respective velocities. When the velocity ratio of the more viscous fluid to the lesser viscous fluid is about 2, with a low flow velocity of about 0.3 feet per second for the lesser viscous fluid, the flow pattern is in the stratified regime. When the velocity ratio of the more viscous fluid to the lesser viscous fluid is reduced to about 0.15 feet per second, the flow regime undergoes a transition to the plug or bubble regime.

Furthermore, when two phases are present either can be laminar, transitional, or turbulent. Accordingly, in stratified flow, for example, the lower viscosity fluid may be in any of these three states while the more viscous fluid may be in the laminar state. In the bubble flow pattern in horizontal circular conduits, it has been observed that the bubbles of the lower density fluid travel along the top of the higher density fluid, while in vertical conduits the bubbles of the lower density fluid travel inside the higher density fluid.

For the case of the injection of the less viscous fluid around the periphery of a horizontal circular conduit when using fluids of equal density, it was observed that the more viscous fluid flowed inside of the less viscous fluid. Of course, this represents the case of an annular flow pattern, but the flow could also be in the stratified pattern, or intermediate between them depending upon the velocities and volumes of flow of the two fluids. With a stratified flow pattern under conditions of laminar flow in a horizontal circular conduit, it would be expected that the less viscous fluid would flow above the more viscous fluid, with the location of the interface between the two fluid dependent upon their volumetric ratio. When considering fluids of unlike density in stratified flow, the lighter fluid would tend to flow above the more dense fluid, and when the lighter fluid is also the less viscous fluid enhancement of this effect would be expected to occur.

Regardless of whether the flowing fluid is in the laminar or turbulent flow regime, a laminar or viscous layer of fluid resides at the conduit wall surface wherein turbulence is absent and there is no mixing normal to the direction of flow within the conduit. Of course, some movement of components normal to the direction of flow is expected because of diffusion. In the present invention, where the flow regime is in the laminar region, we are operating in the state described as the laminar boundary layer, which results in our experiencing the thicker layer of whatever fluid may be present therein.

Applying these fluid dynamic criteria with the assumption that they apply in kind to the partially miscible complex fluid liquid-liquid system of a nitrocellulose lacquer coating composition and supercritical carbon dioxide mixture of the present instance, it is believed that the point within the present apparatus with the greatest susceptibility for precipitation exists within the 180° mixing tee run, with the tee positioned with the run in the horizontal position, wherein the coating composition and the carbon dioxide flows meet after the injection of carbon dioxide in the turbulent flow regime into the run of the mixing tee opposite to the injection of coating material fluid in the laminar flow regime into the other end of the run of said tee with the combined flow exiting from the branch of the tee in the laminar flow regime; and, next within the branch of said tee into which both streams flow first into and then out of.

Although the actual flow pattern existing within the horizontal 180° mixing tee is unknown, we believe precipitation of polymer occurs by the effect of one or more of the bubble, plug, stratified, or annular flow patterns established when the turbulent flowing nonsolvent supercritical carbon dioxide liquid is injected and then comes into contact with the coating composition present in the near-zero-velocity relatively thick boundary layer at the walls of the run and branch of the mixing tee. Within said region supersaturation is reached rapidly followed by the eventual dissolution of polymer, thereby resulting in the growth of polymer upon the wall surface of the mixing tee.

Particularly, we would expect such results with the run of the tee and associated tubing in a horizontal position, wherein the less dense, less viscous carbon dioxide fluid would be expected to be in an outer annulus around a core of coating material fluid, if the flow pattern is annular, and precipitation of polymer occurring either: (1) upon the walls, or (2) at the interface between the two fluids, or in the peripheral region, from which it could easily become attracted to the wall of the tee and growing thereon resulting in its plugging or the sloughing off of solid material, which then can plug downstream apparatus. Moreover, all of the above mechanisms could be present and contributing to such plugging. Similar phenomenon would occur should the flow pattern be bubble, plug, or stratified, wherein the less dense less viscous carbon dioxide fluid would flow above the more dense more viscous coating material fluid and come into contact with coating material on the wall. We would expect that this type of flow pattern would exist regardless whether the injected carbon dioxide fluid is in laminar or turbulent flow.

In one experiment that we conducted, a static mixer was incorporated into the apparatus between the coating composition 90° mixing tee and the supercritical carbon dioxide 90° mixing tee. We observed partial blocking of the circulation loop as indicated by about a 20 percent drop in the circulation loop pressure accompanied by about a 40 to 50 percent drop in supercritical carbon dioxide feed rate, and surging would occur as plugs broke loose causing about a 500 percent increase in the carbon dioxide feed rate, which rate was 200 percent greater than the normal feed rate. Where operation of the apparatus was allowed to continue, we observed eventual stalling of the loop pump. Inspection of the disassembled equipment after shutdown showed partial blockage of the static mixer that was located downstream of the carbon dioxide 90° mixing tee, and the $\frac{3}{8}$ inch tubing mixing tee used was found to be almost completely plugged with very hard solid polymer. It is apparent, therefore, that providing intensified mixing in this manner at this point in the apparatus was ineffective.

With this same apparatus, in cases where spraying was discontinued, which constitutes a normal condition between actual spraying of the admixed coating formulation with continual flowing of the admixed coating formulation within the circulation loop without addition of either coating composition nor supercritical carbon dioxide fluids into the loop, the problem would slowly correct itself, which indicated that the precipitated polymer gel was eventually going back into solution because the composition in the circulation loop was such that at equilibrium a single-phase system should exist. However, the time required for this event to occur was not short enough to resolve the problem in a practical manner.

In another experiment that we conducted, the apparatus was modified to enhance turbulence within the carbon dioxide 90° mixing tee by installing a Circle Seal check with the exposed seat screwed into a $\frac{3}{8}$ inch pipe tee used as the carbon dioxide injection point. We observed an increase in the rate of plugging to an extent that it occurred immediately after initiating the carbon dioxide feed causing plugging such that the carbon dioxide feed rate never reached the design rate. Inspection of the apparatus after shutdown showed the carbon dioxide injection point (the $\frac{3}{8}$ inch pipe tee run) to be nearly blocked solid with a hard solid polymer. Although, based on theoretical expectations, the same flow pattern should exist regardless of the flow regime of the carbon dioxide, either laminar or turbulent, or in transition between the two, apparently turbulence produced enough eddies or other phenomenon such that plugging was intensified.

Confirmation of the undesirability of having turbulence at the carbon dioxide injection point was obtained in yet another experiment which we conducted in which the apparatus was modified in an attempt to minimize eddies by the close coupling of apparatus components in the polymer and carbon dioxide injection points. The results in this case showed a reduction in the plugging over the aforementioned experiments, probably because only a thin film of polymer was being formed at the carbon dioxide point of entry at the injection point. Although, we observed repeated plugging, it also blew free. The undesirable less severe surges in the carbon dioxide flow rate that occurred, dropping by about 10 percent and then surging upward by about 180 percent to about 150 percent of normal flow rates, however, were still too excessive for the effective operation of the spray coating apparatus.

From the preceding discussion, it is clear that at the point of mixing the supercritical carbon dioxide non-solvent liquid and the polymer solution fluid, precipitation of polymer could and does occur due to effects governed by principles of fluid mechanics and by principles associated with the thermodynamics of phase equilibrium.

We believe that the precipitation phenomena is related to the structure of the polymers or resins utilized and how such structure influences the redissolving of and other phenomena associated with the Precipitated polymer or resin.

Without wishing to be bound by theory, the structure of importance relates to the nature of the molecular order of long-chain molecules, such as polymers or resins. Many polymers, when solidifying from their melts, assume the properties of glasses or supercooled liquids. That is, they do not exhibit signs of anisotropy, their x-ray diagram looks like that of a liquid, and they soften gradually with increasing temperature and harden reversibly upon cooling. Seemingly, the macromolecules are randomly arranged in space. Many linear polymers and copolymers occur primarily in this state, they exhibit the properties of structureless resinous plastics that become brittle at low temperatures, and at elevated temperatures either soften gradually to form viscous melts or harden to form insoluble and infusible thermosetting resins.

Many other linear polymers, however, display a different behavior. Specifically, if cooled from a melt or precipitated from solution, the macromolecules of these polymers show a definite inclination to establish arrays of lateral order wherein the axes of the individual chain molecules are parallel. In a sense, as one passes in a direction perpendicular to the chain axes, a certain amount of regularity exists. These laterally ordered areas are termed "crystallites" or "micelles," although they do not have all of the properties historically associated with these terms. It appears that crystallization of macromolecules is generally favored when the chains possess a regular structure. On the other hand, however, macromolecules with irregular chain structure, particularly random copolymers, favor the formation of amorphous polymers. Although, very few, if any, are completely amorphous or crystalline; almost all polymeric substances lie between these two extremes of order and disorder. The ratio of crystalline to amorphous content has a great influence upon the properties of the polymers.

The crystallites of a polymer can be different in size, shape, and may be oriented, and they are intimately connected with the amorphous matrix because the same macromolecule may pass through several crystalline and disordered areas. In the aggregate, polymer chains may go through more than one crystalline and amorphous region. Therefore, depending upon their molecular order, polymers have crystalline-amorphous character which depends on many factors, not the least of which are the monomer(s) from which they are derived, and the molecular weight of the polymer chain produced.

The crystalline-amorphous character of the polymer can have a significant effect upon its properties. With respect to solubility, for example, linear amorphous polymers dissolve more readily in a wide range of organic solvents than do predominately crystalline polymers, which can be dissolved only under limited conditions in a few specific solvents, or than those for that matter with three-dimension spatial configuration, which are most often nearly insoluble. However, crystalline polymers can be dissolved readily above their melting point, where sufficient thermal energy has already been supplied to separate the polymer molecules from their tight crystalline structure. Flexible linear macromolecules such as starch are more soluble than rigid molecules such as cellulose, for example, i.e., very rigid polymers show little solubility. Crystallinity decreases the solubility of polymers markedly, mainly because the process of solution consists of overcoming the heat and entropy factors identified with crystallization as well as those of the intermolecular interactions in the amorphous regions.

As aforementioned, when a certain concentration is reached as non-solvent is added to a polymer solution, the homogeneous liquid separates into a mobile, liquid phase and a swollen polymer or gel phase. When this gel phase consists of linear polymer with predominately amorphous character, such gel is easily penetrated by solvent which very readily can result in the precipitated swollen polymer redissolving. On the other hand, when the gel phase consists of linear polymer with predominately crystalline character, solvent does not readily penetrate that portion of the gel which contains the crystallites or micelles and redissolving becomes most difficult, particularly if the crystallites have diffused to become growing spherulites. Moreover, in the latter type of polymer, solubility is usually confined to the amorphous regions, and although these regions would be solubilized, the crystalline portion may well not be, as crystallization is not always reversible and the best which may be expected is the swelling of the gelatinous mass.

Accordingly, we have observed that once the polymer is precipitated, its ability to be redissolved, or go back into solution in the presence of solvent, is influenced markedly by the amorphous-crystalline character of the polymer.

Using this rational, the polymers specified in the coating compositions utilized in the aforementioned Examples of the related Applications and Experiments which we conducted were scrutinized. Based upon the best data available in the literature, it is believed that of the polymers and resins used, only the nitrocellulose resin has considerable crystalline character. In fact, cellulose, the nitrocellulose precursor, is a regular crystalline array of parallel helices, and the hydroxyl groups of the monomer unit produce a buildup of hydrogen bonding which is strong, high-melting, and insoluble. The other polymers, from the group comprising acrylics, amino, polyesters, alkyds, etc., are amorphous, with very little, if any, crystalline character.

We therefore believe, again not wishing to be bound by theory, that in the mixing tee used with the apparatus and methods disclosed in the aforementioned related patent applications, when bubbles, plugs, slugs or stratified flow of carbon dioxide, a non-solvent for the polymer, reaches the polymer solution present in the laminar boundary layer, it causes precipitation in the form of a swollen gel that apparently forms a film and further grows into significant deposits of polymer. When the polymer so deposited has more crystalline character, such as we observed with the nitrocellulose, we believe that it was not being readily dissolved as the deposit's surface is swept by components of the flowing fluid high in solvent concentration such that dissolution of polymer in the said deposit would otherwise be possible, because the said composition can accommodate the deposited polymer without penetrating the two-phase boundary. Such being the case, the deposit continues to grow until it completely plugs the injection and mixing tee and/or downstream devices when some of the deposit dissociates and is not dissolved prior to reaching said devices. Since the liquid flow is laminar, mixing normal to the flow axis, except by diffusion, does not occur, which could disperse somewhat better bubbles, plugs, etc., of carbon dioxide present, and in effect aid in dissolving precipitated and deposited polymer.

On the other hand, when the polymer in the coating composition is amorphous, or amorphous with only little crystalline character, it is believed that the same phenomenon occurs. That is, as before, polymer is precipitated and deposited in the mixing tee as a film or as other similar deposits because of bubbles, plugs, etc., of carbon dioxide, but in this case when the polymer is amorphous, the film is readily penetrated by solvent and coating composition sweeping the surface of the film or deposits and dissolution occurs. Moreover, an equilibrium is probably established resulting in a residual thin film that does not continue to develop into a substantial deposit that could cause plugging. Likewise, should any precipitate disengage as discrete particles from the wall, or for that matter any particles be developed in the mainstream of the flow itself by bubbles, plugs, etc., of carbon dioxide, such particles should readily be dissolved by the same mechanism.

Further, if such particles persisted, it is hypothesized they would exist in a matrix such that solvent would surround the swollen polymer thereby minimizing the probability of agglomeration with the formation of gels and/or deposition within the spray apparatus. In effect, such particles would behave as discrete particles much like other solid insolubles, such as pigments, metallic flakes, and the like.

Such a hypotheses is reinforced by what was experienced in aforementioned U.S. patent application Ser. No. 218,910, and Ser. No. 327,274, with coating compositions comprised of amorphous polymers and resins, wherein the system was purposely projected into the two-phase region, signified by solid particles of polymer precipitated from solution, without any observable plugging of the apparatus, nor substantial change in the quality of the coating sprayed onto the substrate.

Clearly, what is needed is a simple method and apparatus to introduce a non-solvent, such as supercritical carbon dioxide, into a fluid containing a dissolved solid, such as a polymer or resin, for example. The method and apparatus should be such so as to prevent the deposition of solids and the possible consequential plugging at the mixing point, and in other downstream apparatus, from the saturation induced precipitation, for example, of polymer(s) and resin(s) in coating compositions and admixed coating formulations by supercritical carbon dioxide fluid acting as a precipitant, as the coating composition fluid and the supercritical fluid liquid are introduced into the apparatus and are mixed and commingled therein.

In particular, methods and apparatus are needed wherein saturation of highly crystalline character polymer(s) and resins(s), does not occur through the contacting of said material by bubbles, plugs, slugs of the non-solvent, such as supercritical fluids, such as carbon dioxide, or even from stratified or annular flow patterns of the same, thereby avoiding the aforementioned precipitation and adherence of said solids within the apparatus and, accordingly, preventing eventual plugging in the apparatus.

The problems that we have recognized cannot be practically and economically solved using conventionally available devices.

SUMMARY OF THE INVENTION

By virtue of the present invention, apparatus and methods have been discovered which substantially prevent the above-noted problems. Thus, by the simple but elegant isocentric low turbulence apparatus of the present invention, means have now been found in which fluids containing dissolved solid(s), including polymers and resins, may be mixed and commingled with non-solvent fluids, which may be a precipitant for one or more of the dissolved solids, without the deposition of precipitated solids within the apparatus, thereby preventing the occurrence of plugging of the apparatus due to precipitation of said solids.

More specifically, by the apparatus of the present invention, means are provided which prevent coating compositions containing polymeric materials, particularly highly crystalline types, such as nitrocellulose and the like, when mixed with a supercritical fluid that is a non-solvent for the polymeric material, from forming deposits within the apparatus from any precipitating solids or from the agglomeration of said precipitant, which may result in the occurrence of plugging of apparatus.

In particular, in accordance with the present invention, a supercritical fluid, such as carbon dioxide, which may be a non-solvent for solids contained in a coating composition, is supplied to the mixing apparatus such that it is interjected as a core of fluid within a flowing viscous coating composition fluid stream, which contains a precipitable solid polymer or resin. Preferably, but not necessarily, the supercritical fluid is injected as a central core within the coating composition fluid stream so that it is concentrically positioned. So too, it is also preferable, but not necessary, that the core of supercritical fluid and the coating composition fluid have circular cross-sections.

This may be accomplished by means of an injector tube which is preferably isocentrically positioned in a conduit carrying a coating composition fluid such that for a finite length, the coating composition flows in the annulus formed by the inner walls of the conduit and the outer walls of the injection tube. At the end of the finite length of the injection tube, the non-solvent, such as the supercritical fluid, is introduced into the flowing coating composition fluid as a central core within said fluid.

Accordingly, the non-solvent, such as the supercritical fluid, becomes completely surrounded by the coating composition fluid. The respective diameters of the injection and conduit tubes containing the supercritical fluid and the coating composition fluid streams, respectively, are selected to provide approximately the same linear velocity in the two fluid streams at their merge point or interface. The selection of the two diameters employed is also influenced by the physical properties of the fluids utilized in that it is most desirable for the coating composition fluid to be flowing in the laminar regime as defined by the Reynolds number. The determination of the proper diameters of the conduits through which the particular fluids flow so as to provide substantially equal linear velocities is well within the skill of those skilled in this art and utilizes basic chemcial engineering principles. While the non-solvent fluid is also desirably flowing in the same laminar regime, it may also be flowing in the transition regime or flowing somewhat in the turbulent regime, as also defined by the Reynolds number, without affecting the performance of the apparatus. In particular, it is desired that the non-solvent fluid flow have a Reynolds number of less than about 3,000 and preferably less than about 2,000.

It is desirable that the velocities of these two fluid streams be approximately equal so that there is little wave-like motion at the interfacial film existing between them so as to avoid perturbations to the streamlines, thereby minimizing velocity vectors, and/or the formation of eddies, in a direction normal to their flow axis, which in turn minimizes the contact of non-solvent molecules with polymer molecules contained in the annular coating composition fluid stream which surrounds the inner non-solvent core. Most preferably, perturbation is also minimized along this interfacial film by coning the exit of the non-solvent fluid injector tubular conduit into a knifelike edge configuration so as to minimize eddies to the streamlines.

In a preferred embodiment, the co-flowing non-solvent/coating composition fluid may, in turn, be interjected within a short distance from being formed into a recycle admixed coating formulation in a similar manner as was the non-solvent into the coating composition. The admixed coating formulation fluid is typically supplied from a source of such material circulating within a loop that contains the spraying apparatus and comprises coating composition which has already been thoroughly admixed with the non-solvent, such as supercritical fluid. As above, the diameter of the tube in which the admixed coating formulation flows is selected such that the velocity of the flowing annular ring-like admixed coating formulation fluid is approximately equal to the velocity of the core of combined fluid formed by the non-solvent fluid enveloped within the coating composition fluid, such that the interfacial film between the combined fluid and the admixed coating formulation fluid streams has little wave-like motion, thereby minimizing perturbation of the streamlines and velocity vectors, and/or eddies, in a direction normal to the flow axis. Here again, the diameter of the outer tube is influenced by the flow regime of the flowing admixed coating formulation fluid stream, wherein it is desirable for said fluid stream to be flowing in the laminar regime, as defined by the Reynolds number.

In this embodiment, it is most preferable to prevent the development of flow vectors normal to the axis of flow so as to minimize non-solvent contacting the coating composition fluid which is at the inner perimeter of the outer tube, wherein the velocity at the perimeter is zero, and, whereby, a condition exists that is conducive to the formation of a solid film, which, in time, may increase until blockage of the flow path occurs.

Consequently, when the non-solvent fluid contained as a core of fluid within the central portion of the coating composition fluid (which as yet has zero non-solvent content), which is then in turn further contained as a columnar core of fluid comprised of the non-solvent-/coating composition within the center portion of the admixed coating formulation fluid, we have minimized the probability of any precipitated polymer formed in the central mainstream of the flowing fluids from reaching the walls of the injector, or from being produced as a film on said walls thereby minimizing, and indeed even preventing, blockage of the apparatus by said precipitate.

While the inner core fluids and surrounding annular fluids are both most preferably concentric relative to one another and have circular cross-sections, it is understood that it is not required that it be so. Non-concentricity and other cross-sectional configurations such as elliptical, octagonal, and the like, may also be utilized but are clearly not as preferred as conventional circular cross-sectional conduits.

Also without wishing to be bound by theory, it is believed that as the fluid stream comprised of the non-solvent inner core and the outer coating composition annular ring which is surrounded and in contact with the non-solvent inner core flows beyond the injection region, mixing first begins to occur through molecular diffusion of the non-solvent fluid through the interfacial film formed between it and the coating composition fluid, thereby beginning the homogenization process. This process continues as the leading edge of a central cone of non-solvent which has formed, disintegrates as the fluid flows further, until it becomes integrated with the coating composition, in essence beginning to form the admixed coating formulation. At nearly the same position within the said injection apparatus, molecular diffusion of components in the inner annular segment through the interfacial film formed between it and the outer annular segment occurs. Such diffusion continues until equilibrium has been reached. Molecular diffusion, by the mechanism of mass transfer, occurs only when the fluids are in laminar flow, and in a direction perpendicular to the velocity direction of the fluids. When fluid is flowing in turbulent flow, eddies exist such that mass transfer occurs by eddy diffusion at a diffusivity which may be orders of magnitude greater than for molecular diffusion.

Accordingly, by maintaining laminar flow conditions by means of the present invention, the probability of large concentrations of non-solvent fluid in the form of bubbles, plugs or slugs in undesirably reaching the outer perimeter of the injector and causing precipitation and solids build-up is minimized. Furthermore, by the same mechanism, precipitation of solids dissolved in the inner annular segment is minimized. As the flow of fluids continues, eddies produced by the fluid flowing through constrictions, enlargements, fittings that change the direction of flow, impingement, and vigorous mixing devices, such as a static mixer, eventually results in the desirable development of a homogeneous mass.

In its broadest embodiment, the present invention is directed to a method for substantially preventing the precipitation of one or more dissolved solids contained within a first fluid when being added to a second fluid containing at least one non-solvent component for the one or more dissolved solids comprising:

a) passing the first fluid containing the one or more dissolved solids through a first conduit as a laminar flow as determined by its Reynolds number; and b) introducing the second fluid containing the at least one non-solvent component as a core of fluid within the first fluid such that the second fluid is completely surrounded by the first fluid, wherein the second fluid is introduced having a Reynolds number of less than about 3000.

In a more preferred embodiment, the present invention is directed to a method for substantially preventing the precipitation of one or more dissolved solids contained within a first fluid when being added to a second fluid containing at least one non-solvent component for the one or more dissolved solids comprising:

a) passing the first fluid containing the one or more dissolved solids through a first conduit as a laminar flow as determined by its Reynolds number;

b) introducing the second fluid containing the at least one non-solvent component as a core of fluid within the first fluid such that the second fluid is completely surrounded by the first fluid, wherein the second fluid is introduced having a Reynolds number of less than about 3000 to form a first columnar array of the first and second fluids flowing at a Reynolds number of less than about 3000; and c) introducing the first columnar array of fluids as a core of fluids within an admixture of the first and second fluids flowing in laminar flow as determined by its Reynolds number so as to form a second columnar array of fluids comprising an inner core of the second fluid, a middle annularly-shaped layer of the first fluid surrounding and in intimate contact with the second fluid, and an outer annularly-shaped layer of the admixture of the first and second fluids surrounding and in intimate contact with the first fluid.

The apparatus of the present invention, in its broader embodiment, is directed to an apparatus for adding one or more fluids to another while substantially preventing the precipitation of one or more dissolved solids contained within a first fluid when being added to a second fluid containing at least one non-solvent component for the one or more dissolved solids comprising:

a) means for passing the first fluid containing the one or more dissolved solids through a first conduit as a laminar flow as determined by its Reynolds number; and b) means for introducing the second fluid containing the at least one non-solvent component as a core of fluid within the first fluid such that the second fluid is completely surrounded by the first fluid, wherein the second fluid is introduced having a Reynolds number of less than about 3000.

As a more prefereed embodiment, the present invention is directed to an apparatus for adding one or more fluids to another while substantially preventing the precipitation of one or more dissolved solids contained within a first fluid when being added to a second fluid containing at least one non-solvent component for the one or more dissolved solids comprising:

a) means for passing the first fluid containing the one or more dissolved solids through a first conduit as a laminar flow as determined by its Reynolds number;

b) means for introducing the second fluid containing the at least one non-solvent component as a core of fluid within the first fluid such that the second fluid is completely surrounded by the first fluid, wherein the second fluid is introduced having a Reynolds number of less than about 3000 to form a first columnar array of the first and second fluids flowing at a Reynolds number of less than about 3000; and c) means for introducing the first columnar array of fluids as a core of fluids within an admixture of the first and second fluids flowing in laminar flow as determined by its Reynolds number so as to form a second columnar array of fluids comprising an inner core of the second fluid, a middle annularly-shaped layer of the first fluid surrounding and in intimate contact with the second fluid, and an outer annularly-shaped layer of the admixture of the first and second fluids surrounding and in intimate contact with the first fluid.

Concentric annular ring-type mixing devices are known in the prior art. Indeed, for example, in U.S. Pat. No. 3,314,611 to McCartney, a spray nozzle is described having a first fluid passageway surrounding a second inner fluid passageway through which highly pressurized fluids flow at high velocities (as much as 500 miles per hour) with both passageways discharging into the atmosphere. The inner passageway supplies, for example, a liquid insecticide, and the outer passageway a carrier fluid, such as air, wherein both fluids meet at a planar surface at the end of the inner passageway such that the air flowing over the outlet end of the inner passageway comes in contact with the liquid being discharged from the inner passageway and causes the liquid to form a thin film on said planar surface which then directly forms very small droplets. In operation, this device uses highly pressurized fluids, one a liquid and the other a gas, flowing at high velocities which it is believed Produce extreme turbulence and shear action which breaks up the liquid, which action is completely contrary to the objectives of the present invention.

Likewise, in U.S. Pat. No. 3,330,484 to Johnson, a complex multicomponent spray gun is described. When the gun is used for foam application, such as spraying polyurethane, a fluid A enters a passageway A defined by a tube inserted into another passageway in which a fluid B enters wherein these two fluids meet where they mix and are then mixed with air further downstream from which they pass through the spray nozzle. Again, the objective is the rapid mixing of the two fluids, of which neither is a precipitant of the other, before they are ejected from the nozzle.

In another similar device, Ivernel in U.S. Pat. No. 3,649,206 discloses several concentric passageways to supply and thoroughly mix a combination of fuels, air, and oxygen before combustion to increase the amount of carbon black produced in the cracking and burning of hydrocarbons. The primary objective is the rapid mixing of these components in a prescribed manner prior to combustion. Indeed, in many combustion devices, concentric tubes are used to mix the fluids. In a steam-oil atomizer assembly, for example, a steam tube surrounding the fuel barrel produces a steam-fuel emulsion which, when released into the furnace, atomizes the oil through rapid expansion of the steam. These are relatively low-pressure devices using pressures of around 100 psig.

Furthermore, in many instances where fluid mixing length studies with turbulent flow in a pipe have been carried out, a second fluid has been introduced into a first fluid by injecting the second fluid at the pipe centerline. The objective of such studies was the determination of methods leading to better mixing. Similarly, in studies of the introduction of water into oil flowing in a pipeline to reduce the resistance to flow, thusly reducing the pumping energy requirements, concentric annular flow was observed, in many instances the water was injected around the periphery of the pipe. In other instances, the oil and water flows were combined concentrically by means of a nozzle in which the oil was introduced inside a water annulus. Since oil and water are immiscible in most instances stratified flow was observed, however at particular combinations of the relative velocities of the oil and water other flow patterns occur.

Accordingly, while concentric, annular-ring type devices have been known in the prior art for the rapid mixing of fluids, there is nothing taught or suggested that such devices may be useful for mixing fluids which contain dissolved solids in one fluid and non-solvents in the other in a manner such that essentially no undesirable precipitation occurs which could lead to plugging of the overall apparatus.

FIG. 3 is a schematic diagram of one embodiment of the present invention showing an isocentric low turbulence injector used in preparing a mixture of a coating composition containing dissolved solids and a non-solvent fluid.

FIG. 4 is a longitudinal cross-section of the isocentric low turbulence injector shown symbolically in FIG. 3.

FIG. 5 is a detailed longitudinal cross-sectional view of a portion of the injector shown in FIG. 4.

FIG. 6 is a longitudinal cross-section of a preferred embodiment of the isocentric low turbulence injector of the present invention. FIG. 6a is an enlarged cross-section view of a portion of the injector shown in FIG. 6.

FIG. 7 is an isometric diagram of a more preferred embodiment of the apparatus shown in FIG. 4 in its utilization in a spray coating apparatus.

FIG. 8 is a schematic diagram of another embodiment of the apparatus which illustrates an automatic solvent flush system for the lower viscosity non-solvent injector port of the isocentric low turbulence injector shown symbolically in FIG. 3.

FIG. 9 is a schematic diagram illustrating the inclusion in a portion of a spray coating apparatus of the most preferred embodiment of the iso-centric low turbulence injector shown in FIG. 6.

DETAILED DESCRIPTION OF THE INVENTION

Figure 1:
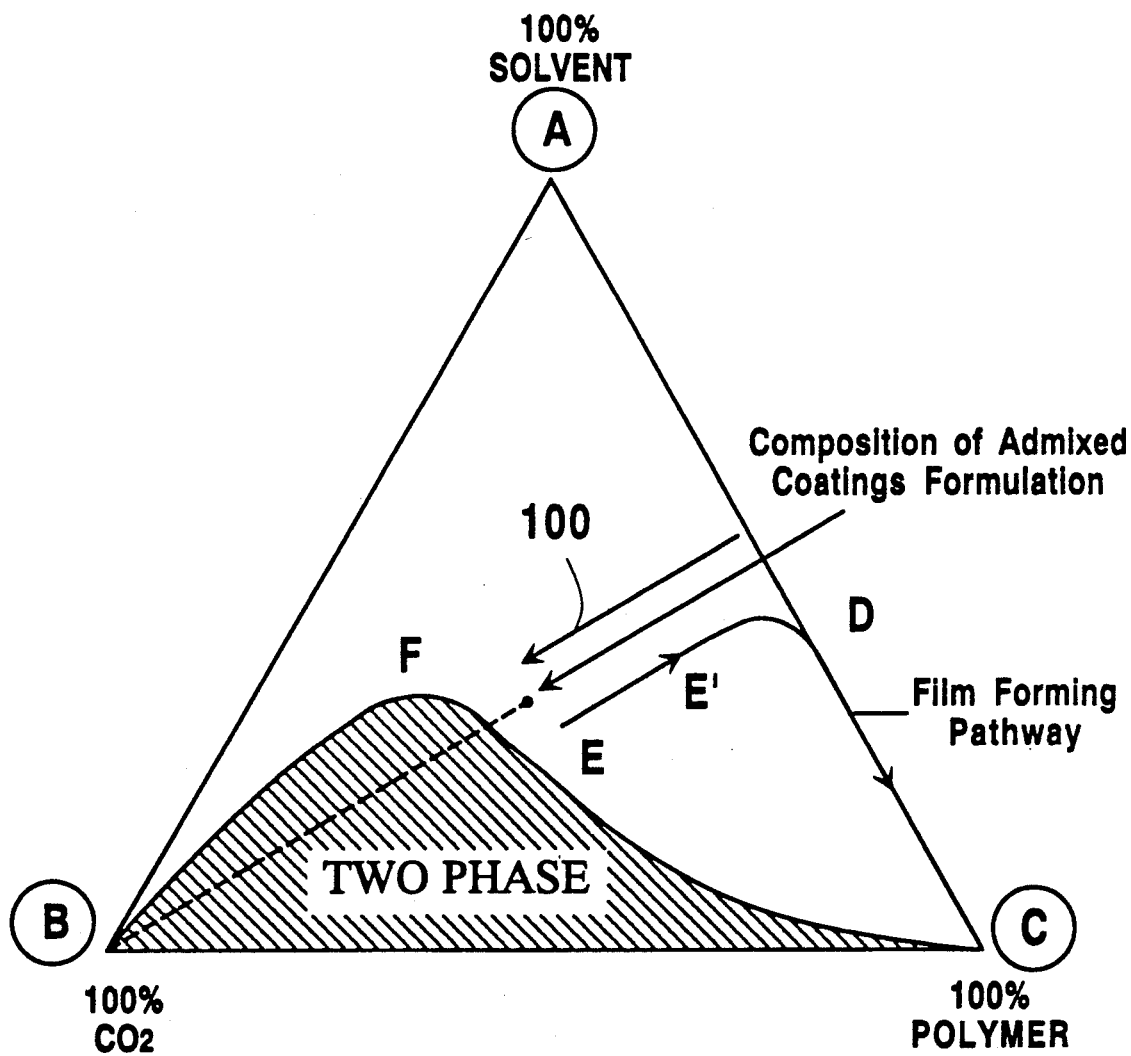
FIG. 1 is a phase diagram of a supercritical carbon dioxide/coating composition.

As used herein, the phrases "coating formulation" or "coating composition" are understood to mean a typical, conventional coating composition which does not have any supercritical fluid admixed therewith. Also as use herein, the phrases "admixed liquid mixture" or "admixed coating formulation" are meant to include an intimate mixture of a coating formulation with at least one supercritical fluid.

It is understood that while the following discussion will primarily focus upon providing a proportioned admixture of liquid mixture of a coating formulation and supercritical fluid, such as carbon dioxide, which is suitable for being sprayed onto a suitable substrate, without the apparatus being fouled, particularly in the mixing device due to precipitated solids, the present invention is in no way limited to this preferred embodiment. As is readily apparent from the foregoing discussion, the present invention encompasses the mixing of any plurality of fluids, one or more of which contains a dissolved solid (compounds below their melting point and as such are solid; polymers, and resins are examples), and likewise, one or more of which contains a non-solvent for said solid(s), to form a desired mixture for any intended subsequent use.

Because of its relevancy to the present invention, a brief discussion of supercritical fluid phenomena is warranted.

Supercritical fluid phenomenon is well documented, see pages F-62-F-64 of the CRC Handbook of Chemistry and Physics, 67th Edition, 1986-1987, published by the CRC Press, Inc., Boca Raton, Fla. At high pressures above the critical point, the resulting supercritical fluid, or "dense gas", will attain densities approaching those of a liquid and will assume some of the properties of a liquid. These properties are dependent upon the fluid composition, temperature, and pressure. As used herein the "critical point" is the transition point at which the liquid and gaseous states of a substance merge into each other and represents the combination of the critical temperature and critical pressure for a given substance. The "critical temperature", as used herein, is defined as the temperature above which a gas cannot be liquified by an increase in pressure. The "critical pressure", as used herein, is defined as that pressure which is just sufficient to cause the appearance of two phases at the critical temperature.

The compressibility of supercritical fluids is great just above the critical temperature where small changes in pressure result in large changes in the density of the supercritical fluid. The "liquid-like" behavior of a supercritical fluid at higher pressures results in greatly enhanced solubilizing capabilities compared to those of the "subcritical" compound, with higher diffusion coefficients and an extended useful temperature range compared to liquids. Compounds of high molecular weight are often miscible with the supercritical fluid at relatively low temperatures.

Near-supercritical liquids also demonstrate miscibility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing miscibility for some solutes. These variations are considered to be within the concept of a supercritical fluid. Therefore, as used herein, the phrase "supercritical fluid" denotes a compound above, at, or slightly below the critical temperature and pressure, i.e., the critical point, of that compound.

Examples of such compounds which are well known to have utility as supercritical fluids are given in Table 1.

TABLE 1

EXAMPLES OF SUPERCRITICAL SOLVENTS

| Compound | Boiling Point (.C) | Critical Temperature (.C) | Critical Pressure (atm) | Critical Density (g/cm) |
|---|---|---|---|---|
| $CO_2$ | −78.5 | 31.3 | 72.9 | 0.448 |
| $NH_3$ | −33.35 | 132.4 | 112.5 | 0.235 |
| $H_2O$ | 100.00 | 374.15 | 218.3 | 0.315 |
| $N_2O$ | −88.56 | 36.5 | 71.7 | 0.45 |
| Xenon | −108.3 | 16.6 | 57.6 | 0.118 |
| Krypton | −153.2 | −63.8 | 54.3 | 0.091 |
| Methane | −164.00 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| pentane | 36.1 | 196.6 | 33.3 | 0.232 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.272 |
| Chlorotrifluoromethane | −31.2 | 28.0 | 38.7 | 0.579 |
| Monofluoromethane | −78.4 | 44.6 | 58.0 | 0.3 |
| Cyclohexanol | 155.65 | 356.0 | 38.0 | 0.273 |

Due to the low cost, environmental acceptability, non-flammability and low critical temperature of carbon dioxide, supercritical carbon dioxide fluid is preferably used with the coating compositions. For many of the same reasons, nitrous oxide ($N_2O$) is a desirable supercritical fluid for admixture with the coating compositions. However, any of the aforementioned supercritical fluids and mixtures thereof are to be considered as being applicable for sue with the coating formulations.

The miscibility of supercritical carbon dioxide is substantially similar to that of a lower aliphatic hydrocarbon and, as a result, one can consider supercritical carbon dioxide as a replacement for the hydrocarbon solvent of a conventional coating formulation. In addition to the environmental benefit of replacing hydrocarbon solvents with supercritical carbon dioxide, there is a safety benefit also, because carbon dioxide is non-flammable.

Due to the miscibility of the supercritical fluid with the coating formulations, a single phase liquid mixture is able to be formed which is not only capable of being sprayed by airless spray techniques, but which forms a desired feathered spray pattern.

The present invention is not narrowly critical to the type of coating compositions that can be sprayed provided that there is less than about 30% by weight of water in the solvent fraction of the formulation. Thus, essentially any coating formulation meeting the aforementioned water limit requirement which is conventionally sprayed with an airless spray technique may also be sprayed by means of the methods and apparatus of the present invention.

Generally, such coating formulations typically include a solids fraction containing at least one component which is capable of forming a coating on a substrate, whether such component is an adhesive, a paint, lacquer, varnish, chemical agent, lubricant, protective oil, non-aqueous detergent, or the like. Typically, at least one component is a polymer component which is well known to those skilled in the coatings art.

Generally, the materials used in the solids fraction of the present invention, such as the polymers, must be able to withstand the temperatures and/or pressures which are involved when they are ultimately admixed with the at least one supercritical fluid. Such applicable polymers include thermoplastic or thermosetting materials or may be cross linkable film forming systems.

In particular, the polymeric components include vinyl, acrylic, styrenic, and interpolymers of the base vinyl, acrylic, and styrenic monomers; polyesters, oil-free alkyds, alkyds, and the like; polyurethanes, oil-modified polyurethanes and thermoplastic urethanes systems; epoxy systems; phenolic systems; cellulosic esters such as acetate butyrate, acetate propionate, and nitrocellulose; amino resins such as urea formaldehyde, melamine formaldehyde, and other aminoplast polymers and resins materials; natural gums and resins; rubber-based adhesives including nitrile rubbers which are copolymers of unsaturated nitriles with dienes, styrene-butadiene rubbers, thermoplastic rubbers, neoprene or polychloroprene rubbers, and the like.

In addition to the polymeric compound that may be contained in the solids fraction, conventional additives which are typically utilized in coatings may also be used. For example, pigments, pigment extenders, metallic flakes, fillers, drying agents, anti-foaming agents, and anti-skinning agents, wetting agents, ultraviolet absorbers, cross-linking agents, and mixtures thereof, may all be utilized in the coating formulation to be sprayed by methods of the present invention.

In connection with the use of the various additives noted above, it is particularly desirable for pigments to be present in the coating formulation inasmuch as it has been found to aid in the diffusion of the supercritical fluid from the sprayed composition resulting in improved atomization.

In addition to the solids fraction, a solvent fraction is also typically employed in the coating formulations whether they be an adhesive composition or a paint, lacquer, varnish, or the like, in order to act as a vehicle in which the solid fraction is transported from one medium to another. As used herein, the solvent fraction is comprised of essentially any active organic solvent and/or non-aqueous diluent which is at least partially miscible with the solids fraction so as to form either a solution, dispersion, or suspension. As used herein, an "active solvent" is a solvent in which the solids fraction is at least partially soluble. The selection of a particular solvent fraction for a given solids fraction in order to form a specific coating formulation for application by airless spray techniques is conventional and well known to those skilled in the art. In general, up to about 30% by weight of water, preferably up to about 20% by weight, may also be present in the solvent fraction provided that a coupling solvent is also present in the formulation. All such solvent fractions are suitable in the present invention.

A coupling-solvent is a solvent in which the polymeric compounds used in the solids fraction is at least partially soluble. Most importantly, however, such a coupling solvent is also at least partially miscible with water. Thus, the coupling solvent enables the miscibility of the solids fraction, the solvent fraction and the water to the extent that a single phase is desirably maintained such that the composition may optimally be sprayed and a good coating formed.

Coupling solvents are well known to those skilled in the art and any conventional coupling solvents which are able to meet the aforementioned characteristics, namely, those in which the polymeric components of the solid fraction is at least partially soluble and in which water is at least partially miscible are all suitable for being used in the present invention.

Applicable coupling solvents which may be used include, but are not limited to, ethylene glycol ethers; propylene glycol ethers; chemical and physical combinations thereof; lactams; cyclic ureas; and the like.

Specific coupling solvents (which are listed in order of most effectiveness to least effectiveness) include butoxy ethanol, propoxy ethanol, hexoxy ethanol, isopropoxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol, and ethoxy ethanol. Also included are lactams such as n-methyl-2-pyrrolidone, and cyclic ureas such as di-methyl ethylene urea.

When water is not present in the coating formulation, a coupling solvent is not necessary, but may still be employed. Other solvents, particularly active solvents, which may be present in typical coating formulations and which may be utilized include ketones such as acetone, methyl ethyl ketone, methyl isobutyl ketone, mesityl oxide, methyl amyl ketone, cyclohexanone and other aliphatic ketones; esters such as methyl acetate, ethyl acetate, alkyl carboxylic esters; ethers, such as methyl t-butyl ether, dibutyl ether, methyl phenyl ether and other aliphatic or alkyl aromatic ethers; glycol ethers such as ethoxy ethanol, butoxy ethanol, ethoxy 2-propanol, propoxy ethanol, butoxy 2-propanol and other glycol ethers; glycol ether esters such as butoxy ethoxy acetate, ethyl 3-ethoxy propionate and other glycol ether esters; alcohols such as methanol, ethanol, propanol, iso-propanol, butanol, iso-butanol, amyl alcohol and other aliphatic alcohols; aromatic hydrocarbons such as toluene, xylene, and other aromatics or mixtures of aromatic solvents; aliphatic hydrocarbons such as VM&P naphtha and mineral spirits, and other aliphatics or mixtures of aliphatics; nitro alkanes such as 2-nitropropane. A review of the structural relationships important to the choice of solvent or solvent blend is given by Dileep et al., *Ind. Eng. Che.* (Product Research and Development) 24, 162, 1985 and Francis, A. W., *J. Phys. Chem.* 58, 1099, 1954.

Of course, there are solvents which can function both as coupling solvents as well as active solvents and the one solvent may be used to accomplish both Purposes. Such solvents include, for example, butoxy ethanol, propoxy ethanol and propoxy 2-propanol. Glycol ethers are particularly preferred.

Suitable additives that are conventionally present in coating formulations that are intended for spray application may also be present: such as, curing agents, plasticizers, surfactants, and the like.

Figure 2:
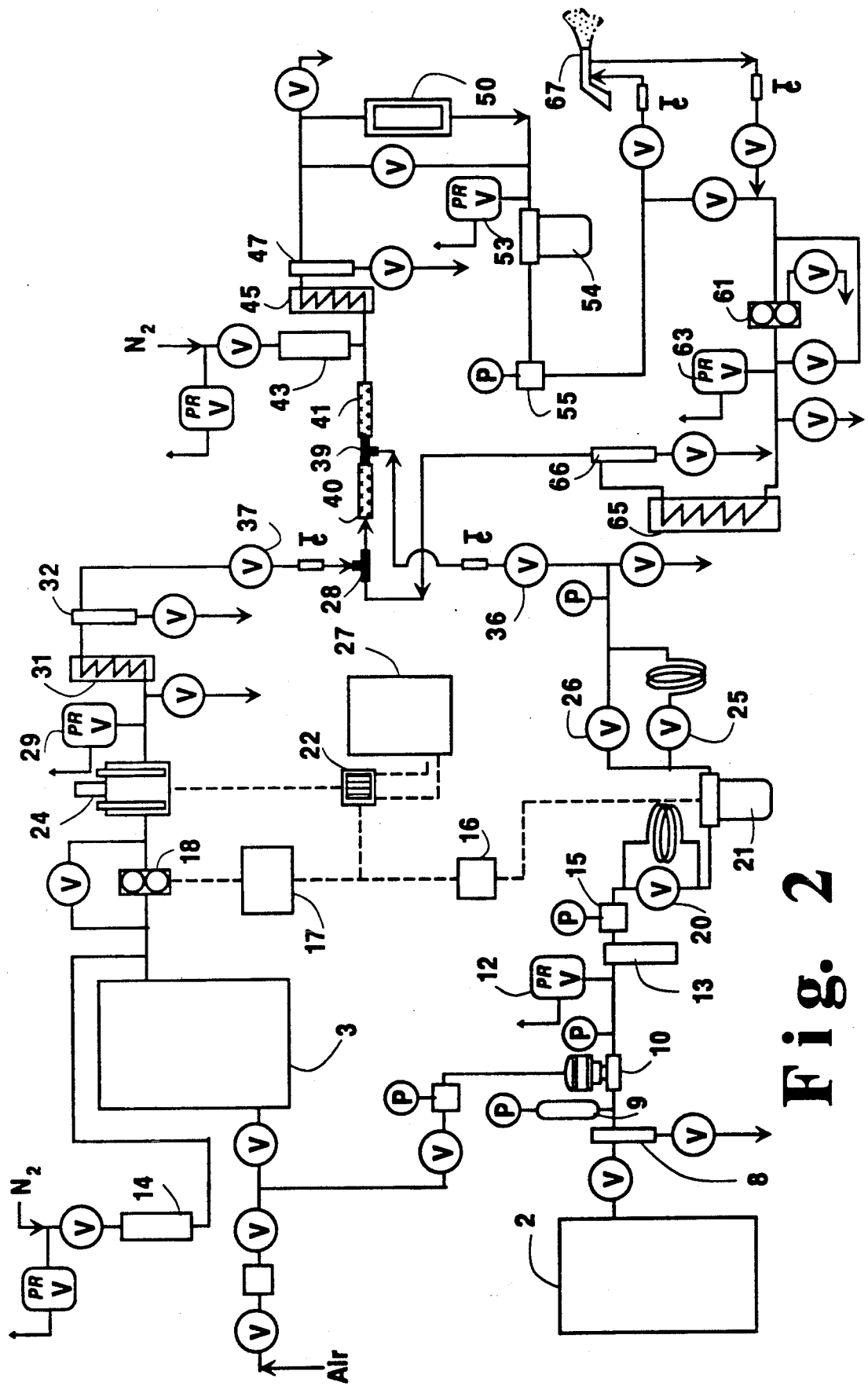
FIG. 2 is a schematic diagram of an embodiment showing a flow scheme which may be used to form a supercritical carbon dioxide/coating composition admixture for spraying which does not utilize the isocentric low turbulence device of the present invention.

Referring now to FIG. 2 which shows a process for forming a sprayable coating composition not using the isocentric low turbulence device of the present invention, carbon dioxide, which is a non-solvent for the polymer contained in the coating composition, is continuously supplied from a cryogenic carbon dioxide feed system shown generally as 2 in the drawing. The cryogenic carbon dioxide at approximately 300 psig is first fed to an air driven carbon dioxide primer pump (not shown) located at the carbon dioxide feed system 2 for initial pressurization. The feed line in between the carbon dioxide source 2 and the primer pump is preferably insulated and also kept refrigerated by bleeding carbon dioxide (approximately 0.5 lb/hr) through a coil wrapped around the feed line. Surge tank 9 is provided to help damp flow fluctuations in the feed line. The carbon dioxide now having a pressure of between about 1000 to about 1400 psig, and after being filtered by in-line filter 8, is then pressurized to a pressure of about 1600 to about 2300 psig by a carbon dioxide liquid pump 10. This liquid pump is a single-acting pump that utilizes a three-way cycling spool that is designed for pumping liquified gases under pressure without requiring refrigeration to avoid cavitation. After passing through disposable in-line filter 13, the pressurized carbon dioxide is then regulated down with a pressure regulator 15 to a steady outlet pressure of about 1300 to about 2000 psig for a typical airless spray gun application.

After being pressurized and regulated, carbon dioxide flows through coriolis meter 21 for a true mass flow rate measurement. A capillary tube and a check valve connected in parallel at 20 is installed prior to the coriolis meter to help avoid a large flow surge and to smooth down the flow rate when pump 10 is activated. A globe valve and a capillary tubing connected in series at 25 is used to control and restrict the carbon dioxide flow during the initial start-up. After the system is pressurized, another globe valve 26 is opened to allow steady flow for normal operation. The measured flow of carbon dioxide enters the circulation loop at the mixing tee 39. A pressure relief valve 12 is used to protect the carbon dioxide system from overpressurization.

The coating composition is fed from a coating supply system generally shown as 3 in the drawing. An accumulator 14 using nitrogen is utilized to offset any pressure pulsation. The coating flow rate is metered by a precision gear pump 18. Viscous coating from 3 is normally pressurized with a booster pump (not shown) to provide sufficient flow through filters and feed lines to the metering pump to avoid cavitation. The pump 18 supplies the positive pressure needed for feeding the coating composition to the recirculation loop. A precision gear measuring device 24 is used for measuring the flow rate of the coating composition. The speed command of the pump 18 is electronically controlled by the speed control system 17 that receives the input signal from the Micro Motion remote electronics unit 16. The coating metering rate is electronically adjusted by a coating flow feedback signal received from measuring device 24. The desired carbon dioxide mass ratio is therefore maintained when the two feeds are combined.

The coating composition flows through one or more heaters 31 which are connected in series and a paint filter 32 before it enters the circulation loop at mixing tee 28. Pressure relief valve 29 is used to protect the coating composition system from overpressurization.

A multi-channel flow computer 22 is used for both instantaneous and cumulative flow rate computation/indication. A general purpose data logger 27 with mathematical capability provides data printing and calculation functions of the characteristics of the two streams.

The coating composition is combined with the circulation loop material at 90° mixing tee 28, wherein the loop material flows in the run of the tee, and the coating composition enters through the branch of the tee. The admixture is passed through static mixer 40. The carbon dioxide is combined with the admixture of the circulation loop material and the coating composition at 90° mixing tee 39, with the carbon dioxide entering through the branch of the tee. It is at this point in the spray coating apparatus wherein polymer(s) and resin(s) in the coating composition, which are dissolved in the solvent(s) come into intimate contact with the supercritical carbon dioxide, which may be, and generally is, a non-solvent for some or all of the contained polymer(s) and resin(s). The admixed coating formulation is passed through another static mixer 41 wherein the combined mixture is further mixed. The check valve 36 and 37 prevent back flow of the two fluids. The mixture is heated and controlled to the desired temperature of between about 40° and about 70° C. in the circulation loop through two respective sets of high pressure heaters 45 and 65, both connected in series. Once heated to this temperature range, the carbon dioxide enters the supercritical state and remains in that state as it is being circulated until it is ultimately sprayed. The mixture also flows through two filters 47 and 66 and is circulated in the loop by a gear pump 61.

An accumulator 43 is used to increase the loop capacity and also used to minimize the pressure pulsation in the loop when spray system 67 is activated. Pressure relief valves 53 and 63 are used to protect the loop from overpressurization. A sight glass 50 is used to view the mixture in the loop and observe its phase. A mass flow meter 54 is used to monitor the fluid density and flow rate in the circulation loop. The admixed liquid mixture is sprayed onto the substrates from spray system 67.

As noted earlier, it is in the 90° mixing tee 39 and in the immediate downstream static mixer 41 wherein plugging problems generally persist when operating the apparatus with, for example, nitrocellulose polymer. During the spraying portion of the operation of the spray apparatus, the non-solvent carbon dioxide enters the 90° mixing tee 39 through the branch of the tee in the state of being in turbulent flow and as such produces eddies along with the bubble, slug, etc., pattern believed common to such liquid-liquid flow regimes. At this point in the apparatus, the carbon dioxide merges with the flowing admixture of recycle loop admixed coating formulation and the coating composition that enters at the 90° mixing tee 28 with said admixture flowing is in the laminar regime. It is believed, as previously delineated, that the aforementioned flow patterns produced by the mixing arrangement of tee 39 created the condition lead to the observed plugging with materials such as the nitrocellulose polymer.

Figure 3:
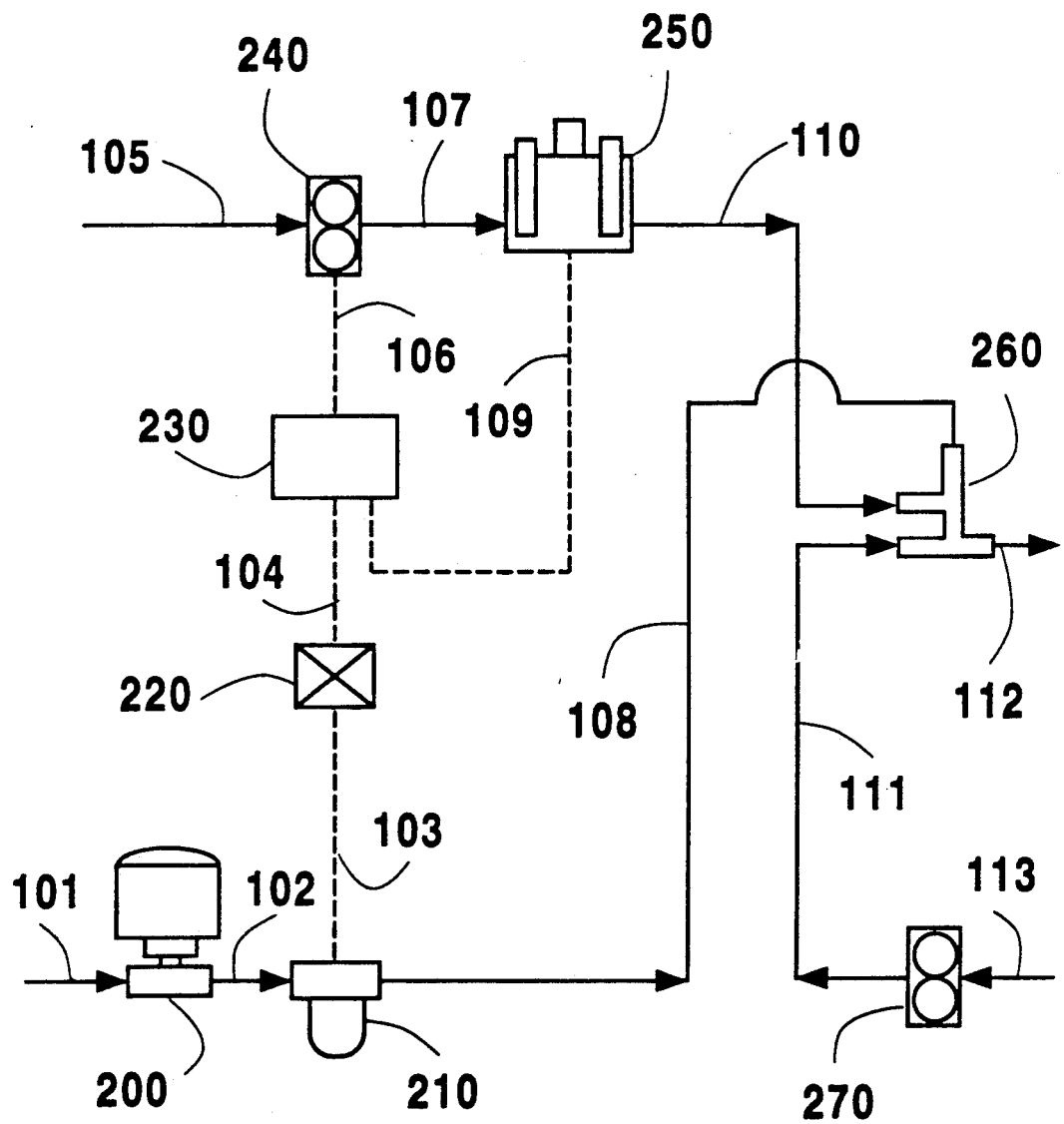

The isocentric low turbulence injector 260 of the present invention is shown symbolically and schematically in FIG. 3 as it is typically located in the relevant portion of a spray coating apparatus. Referring now to FIG. 3, a compressible fluid, which is a non-solvent for the dissolved solid, such as a polymer, contained in the coating composition, which is to be proportionately mixed with a non-compressible fluid containing said dissolved solid to form a desired admixture, is introduced from a supply source (not shown) to pumping means 200 via line 101. The compressible fluid is then pumped via line 102 past meter 210 for measuring the mass flow rate of the compressible fluid.

In the broad embodiment of the present invention, pumping means 200 is not narrowly critical to the present invention. It may comprise any kind of a pump that is capable of pumping a compressible fluid and it may be driven by any conventional means. For example, a conventional reciprocating pump which is well known to those skilled in the art is quite suitable.

Mass flow rate measuring means 210 may comprise any conventionally available mass flow rate measuring device such as a Micro Motion Model D mass flow meter manufactured by Micro Motion Inc. of Boulder, Colo. Generally, such mass flow rate measuring devices are known as coriolis meters. In contrast to most flow metering techniques which measure fluid volume, the measuring means 210 measures mass flow. Relying on volume as a meaningful measuring device is inaccurate at best when dealing with compressible fluids. The volume of a compressible fluid may change, sometimes radically, in response to changing fluid temperature, pressure or composition. One property of a fluid which is unaffected by environmental conditions is its mass. It is this characteristic of the compressible fluid which is desirably measured and from which the rate of flow of the non-compressible fluid is controlled.

The mass flow rate measured by measuring means 210 is electronically transmitted by an electronic signal to a receiving device 220 via dotted line 103 which in turn sends out an electronic signal through dotted line 106 to electronic ratio controller 230. All of these electronic sensors and receivers are well known to those skilled in the art and are not narrowly critical to the present invention.

Simultaneously, non-compressible fluid is supplied via line 105 to pumping means 240. Preferably, pumping means 240 is desirably a positive displacement pump and even more preferably a precision gear pump which are known to those skilled in the art. Such pumps are capable of delivering substantially precise amounts of the non-compressible fluid on demand.

The ratio controller 230 contains logic circuitry which can be programmed to accept the electronic signal from device 220 and in turn generates a signal through dotted line 106 which controls the speed at which pump 240 operates. Correspondingly, the amount of non-compressible fluid that leaves pump 240 and enters line 107 is precisely controlled to a predetermined ratio relative to the amount of compressible fluid measured and passed into line 108.

Preferably, but not necessarily, the non-compressible fluid leaving pumping means 240 through line 107 is then passed into measuring device 250 to measure the actual flow rate of the non-compressible fluid. The flow rate that is measured may be on a volumetric or mass flow rate basis. Such a measuring device may comprise, for example, a precision gear meter such as is available from AW Company (Racine, Wis.). The type of measuring device is not narrowly critical to the present invention. Since the material that is being measured is substantially non-compressible, its density will not materially vary over time. Accordingly, although what is being measured by this measuring device may be a volumetric flow rate, its accuracy here is quite acceptable in order to obtain an accurately proportioned final mixture.

The flow rate measured by measuring device 250 generates a flow feedback signal which is electronically received by the ratio controller 230 through dotted line 109. The controller compares the actual flow rate that is measured by measuring device 250 with the required flow rate needed to provide the desired ratio of non-compressible and compressible fluids based on its preset programming and makes any adjustments needed to the speed of pump 240 so as to obtain that required flow rate.

The non-compressible fluid leaving through line 110 and the compressible fluid leaving through line 108 enter isocentric injector merging means 260 via their respective lines in accordance with the present invention. Desirably, check valves (not shown) may be provided in each of lines 108 and 110 so as to prevent any backmixing. Recycle fluid in the circulation loop (not shown, but which loop may be comprised of static mixers, heaters, an accumulator, a sight glass, a density measuring device and the spraying means) comprised of the admixture of compressible and non-compressible fluids may be supplied via line 113 to recycle pumping means 270. Preferably, pumping means 270 is a positive displacement pump and even more preferably a precision gear pump, which are known to those skilled in the art. The recycle fluid leaving pump 270 through line 111 may, in a preferred embodiment, be introduced into the merging means 260. However, it is to be understood that the present invention, in its broadest embodiment, does not require that recyled fluid be incorporated with the columnar fluid once it has been formed by the isocentric device to form, in turn, yet a second columnar fluids structure comprised of an innermost core of non-solvent fluid, an adjacent annulus of a fluid containing dissolved solids, and an outermost annular layer containing the recyle fluid. The broadest embodiment of the present invention comprises the formation of the inner core of non-solvent surrounded by the outer adjacent annulus of the fluid containing the dissolved solids.

Injector merging means 260 may comprise any effective mixing device capable of merging the two fluids without film formation on the walls due to the precipitation of dissolved solids contained within one of the fluids, causing plugging therein, and/or causing plugging of downstream apparatus connected via line 112. In injector merging means 260 of the present invention, the compressible fluid (a non-solvent for the polymer dissolved in the coating composition) enters vertically downwards, via line 108, through a small diameter tube that traverses vertically downwards internally in the merging means to just before it merges with the horizontally flowing recycle fluid, entering via line 111, that is flowing internally in the run of the merging means. Non-compressible fluid (containing the dissolved solids) enters the injector merging means 260, via line 110, horizontally into an annulus formed between the outside wall of the vertical tube and the inside wall of that part of the merging means in the vertical direction. (See FIG. 4.) At the point of entering the annulus, the non-compressible fluid experiences a 90° change in its flow path.

The desired, accurately proportioned mixture of compressible and non-compressible fluid leaves the injector merging means 260 via line 112 for additional processing or final use, as required (not shown). Preferably, line 112 is connected to a static mixer to provide a well mixed flowing stream.

As discussed earlier, the present invention is particularly applicable, although certainly not limited to, being able to prepare an admixed liquid mixture of an accurately proportioned amount of supercritical fluid, particularly supercritical carbon dioxide, with a coating composition.

Figure 4:
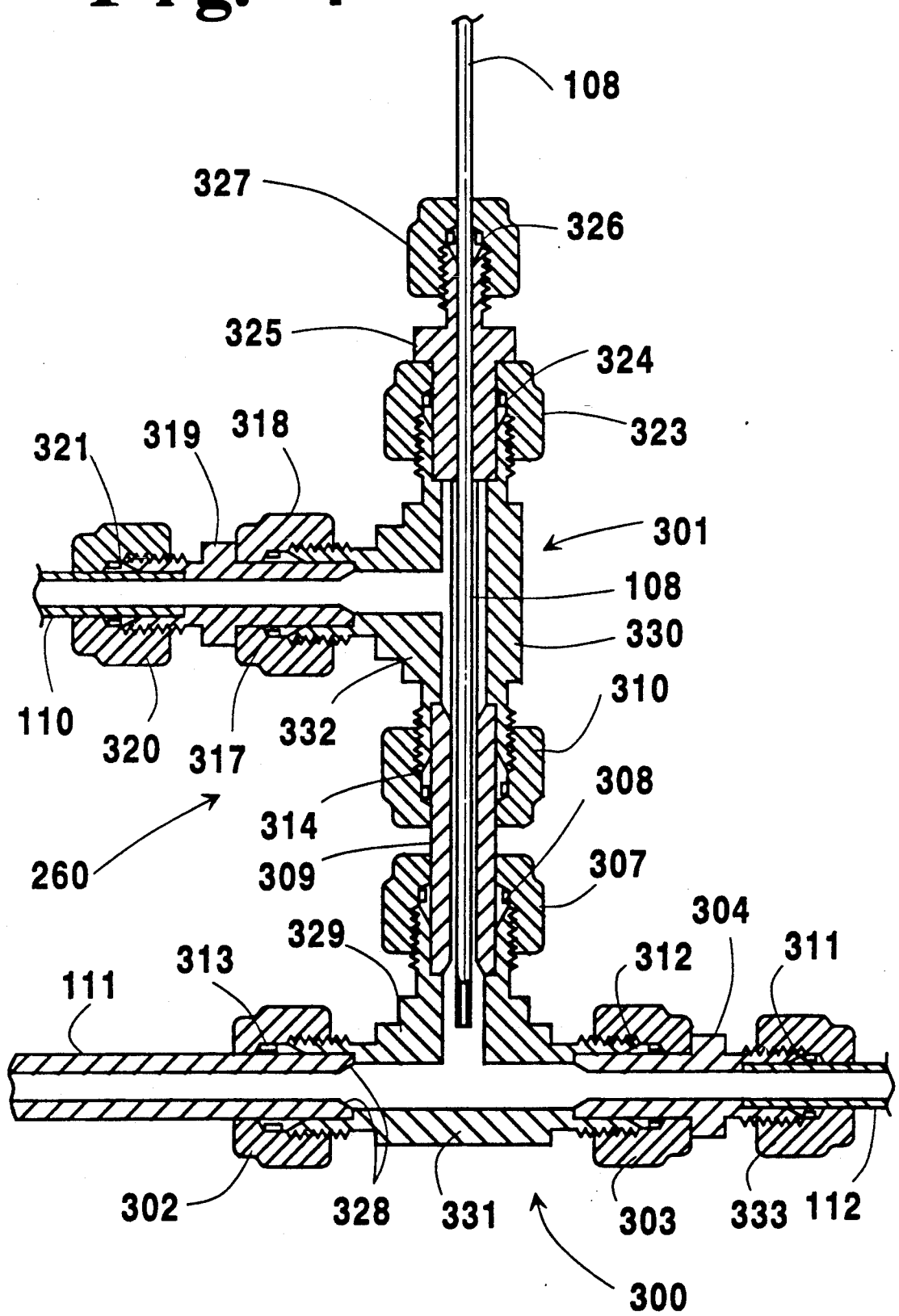

FIG. 4 illustrates a cross-sectional view of one form of the isocentric low turbulence injector merging means 260 shown in FIG. 3 (which is a segment of the spray coating apparatus) that can be used to effect the desired merging of the non-solvent compressible fluid, the incompressible coating composition fluid, and, if desired, the recycle admixed coating formulation fluid, without resulting in the undesirable solids formation and plugging of the apparatus therefrom. It is understood that the scope of the present invention also includes other injector designs which are capable of accommodating the merging of the non-solvent compressible fluid and the coating composition alone and the merging of the non-solvent compressible fluid and the coating composition with recycled admixed coating formulation recycle without solids formation within the device which may cause plugging of the said merging devices and other contiguous devices.

In particular, the merging means assembly 260 comprises two tube fitting tees 300 and 301 and tubing 108, all of which may be any commercially obtainable tubing fittings and tubing such as Swagelok TM tube fittings and tubing.

The branch 329 of union tee 300 is connected to the run 330 of union tee 301 by tubing 309, one end of which is secured and retained to branch 329 of tee 300 by back and front ferrule combination 308 and threaded nut 307. The other end of tubing 309 is secured and retained to one end of the run 330 of union tee 301 by back and front ferrule combination 314 and threaded nut 310. Tubing 111 is connected to one end of the run 331 of the tee 300 and is secured and retained by front and back ferrule combination 313 and threaded nut 302. Tubing 112 is connected to the reducer 304 and is secured and retained by front and back ferrule combination 311 and threaded nut 333, with the reducer 304 attached to the other end of the run 331 of union tee 300 and is secured and retained by front and back ferrule combination 312 and threaded nut 303. The tubing 110 is connected to the reducer 319 and is secured and retained by front and back ferrule combination 321 and threaded nut 320, with the reducer 319 connected to the branch 332 of the tee 301 and is secured and retained by front and back ferrule combination 317 and threaded nut 318. The other end of the run 330 of the tee 301 is connected to the bored through reducer 325 which is secured and retained to 301 by the front and back ferrule combination 324 and threaded nut 323.

Tubing 108 is passed through bored reducer 325 and its open end is positioned a distance H from the top of the bore of run 331 of tee 300. This position of the tubing 108 is secured and retained by front and back ferule combination 326 and threaded nut 327. Distance H is important in attaining the liquid-liquid fluid flow pattern resulting in the desired elimination of the plugging problem. Preferably, this distance, which is measured as relative diameters of tube 108, is in the range of from about 0 to about 2.0 diameters, more preferably it is in the range of from about 0.5 to about 1.5 diameters, and most preferably, distance H is about 1.0 diameter of tube 108.

The outer wall of tubing 108 forms the inner wall of an annulus, the outer wall of which is formed by the bore of run 330 of tee 301. The outer diameter of tubing 108 and the inner bore of tee 301 are selected to form an annulus with a cross-sectional area such that, based on the physical properties of the non-compressible solids containing fluid, the flow velocity therein is about equal to the flow velocity of the compressible non-solvent fluid flowing internally within the tube 108, based upon its inside diameter and physical properties. Further, to facilitate producing the desired flow characteristics, (i.e., mainly the suppression of the formation of eddies) the ends of tubing 111 and 309, which abut the milled shoulders of tee 300 are milled to form a shape 328 that is similar to the frustum of a cone, as shown on tubing 111. The larger diameter end of reducer 304, which also abuts the milled shoulder of tee 300 is likewise milled in the shape of the frustum of a cone. Such milling desirably provides a smooth transition at the juncture of the tubing and the reducer as they are positioned at the milled shoulders within the tee, thereby further minimizing the formation of eddies which would contribute to undesired turbulence.

Likewise, the end of the tubing 108 positioned by distance H from the upper surface of the bore of run 331 is milled internally to form a shape similar to the frustum of a cone, resulting in a knife-edge shape where the compressible fluid exits tubing 108. Moreover, tubing 108 may alternately be milled on the outer diameter, or, indeed, may be milled both internally and externally to effect the desirable knife-edge shape. In particular, by such milling, the formation of undesirable eddies is minimized along the merge line within tee 300, thereby creating laminar, or nearly laminar, streamlines in all of the fluid streams, which then have little, if any, velocity vectors normal to the axial flow of fluid within said tee. In this manner, the non-solvent fluid is mainly prevented from undesirably contacting the walls of the merging means as it is interjected into the recirculating fluid stream from the recycle loop (line 111 in FIG. 3), while some velocity and diffusion gradients establish some gently mixing action within the main body of the combined streams.

Figure 5:
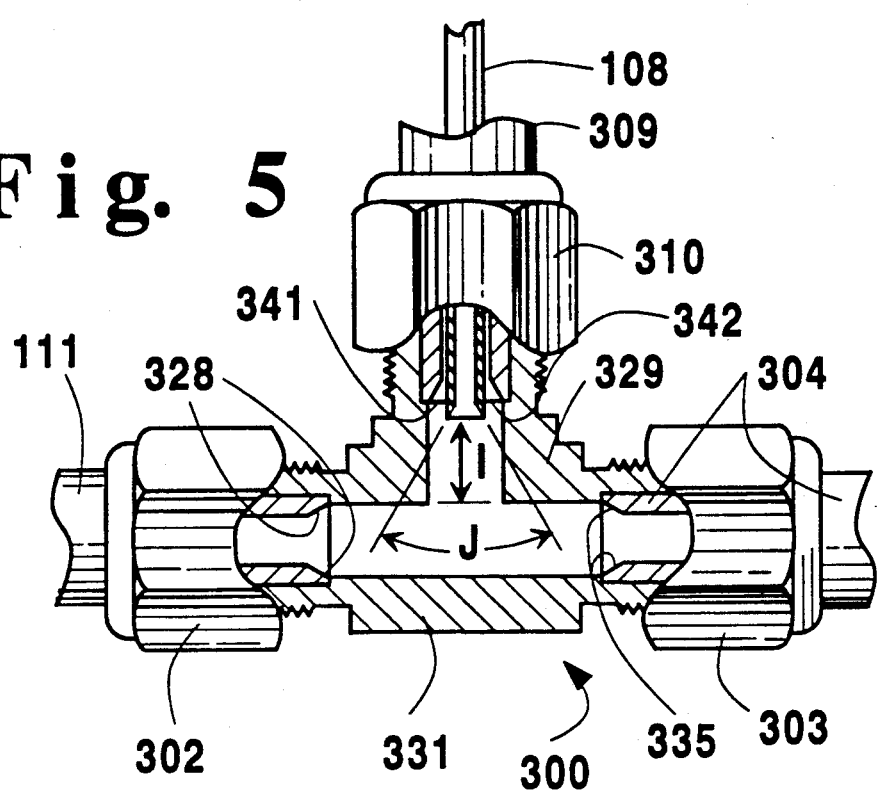

Turning to FIG. 5 in which the same reference numerals of FIG. 4 are used to identify like elements, the fluid merging segment in union tee 300 is shown in cross section is greater detail. As shown in the Figure, tubing 108 is juxtapositioned in tee 300 such that it is concentric with the inner wall of branch 329 of said tee. The cone end of tubing 108 is fabricated by milling the internal wall of said tubing in the general shape of a frustum of a cone with an included angle J, which is preferably an angle of about 15 to about 60 degrees, more preferably at an angle of from about 15 to about 30 degrees. Such an angle desirably produces a knife edge configuration such that eddies are minimized along the merge area of the fluids flowing in tubing 108 and the annulus formed by the inner wall of tee 300 and the outer wall of tubing 108. So too, end 335 of reducer 304 positioned to abut the shoulder of tee 300 is milled in the general shape of a frustum of a cone to effect a smooth transition at said juncture, thereby minimizing the formation of eddies in the fluid flowing in this vicinity as well. Likewise, end 328 of tubing 111 and end 341 of tubing 309 are milled in the general shape of a frustum of a cone to create the same effect of a smooth transition as the fluids flow from one component or part to another within the apparatus; that is, generating a transition while maintaining a minimum of eddies.

Accordingly, by means of the injector device of the present invention, minimal turbulence and eddies are produced in the interfacial streamlines during the commingling of the non-solvent fluid and the solids containing fluid thereby helping to prevent undesirable plugging.

In operation, the isocentric low turbulence injector merging means 260, as utilized within the spray coating apparatus illustrated in FIGS. 3 and 4, with the device sized such that the coating composition and the carbon dioxide liquid average flow velocities are about equal, is continuously supplied with admixed coating formulation fluid flowing in laminar flow from the recycle loop in line 110 into run 331 of tee 300 wherein, at the intersection of the branch 329 of tee 300, it merges with the non-solvent carbon dioxide fluid centrally captured within the coating composition fluid entering tee 300, which may be flowing in the turbulent, the transition, or the laminar flow regime, but most preferably is in laminar flow. The merged fluid flow stream, also in laminar flow, then proceeds through reducer 304 into line 112, which flow supplies the recirculation loop with admixed coating formulation to the portion of the apparatus upstream of the components of the spray coating apparatus, as shown in FIG. 2, consisting of, but not limited to: the static mixers, an accumulator, the heaters and filters, the sight glass, the density meter and the spray gun, all of which are before the circulation loop pump (shown as pump 61 in FIG. 2 and pump 270 in FIG. 3). This loop operates to continuously supply proportioned, mixed, pressurized and heated admixed coating formulation to the spray gun (at a temperature and a pressure which are just below, at, or above the supercritical point of the carbon dioxide). The laminar flow streamlines and the annular flow pattern believed established by the coating composition and the recycle admixed coating formulation streams prevent carbon dioxide from contacting the walls of the fittings and the tubing which comprise the isocentric low turbulence injector, while some velocity gradients (eddies) normal to the flow establish some mild mixing action within the main body of the commingled streams. At the interfaces of the streamlines of the coating composition and of the carbon dioxide, the concentration of the non-solvent carbon dioxide is below that of the saturation level for the dissolved polymer, thereby minimizing and/or preventing precipitation of said polymer or resin dissolved in the coating composition. Generally, the recycle admixed coating formulation liquid stream flow rate is several times that of the sum of the coating composition and carbon dioxide stream flows.

Although the isocentric low turbulence injector shown in FIGS. 4 and 5 illustrates tee 300 with a conventional 90° angle existing between the merged coating composition and carbon dioxide flow stream relative to the recirculation stream, other designs would also be suitable to attain the benefits of the present invention. For instance, a lateral with an angle less than 90°, or a "Y", with a continuum of angles possible between the branches thereof are also suitable.

Figure 6A:
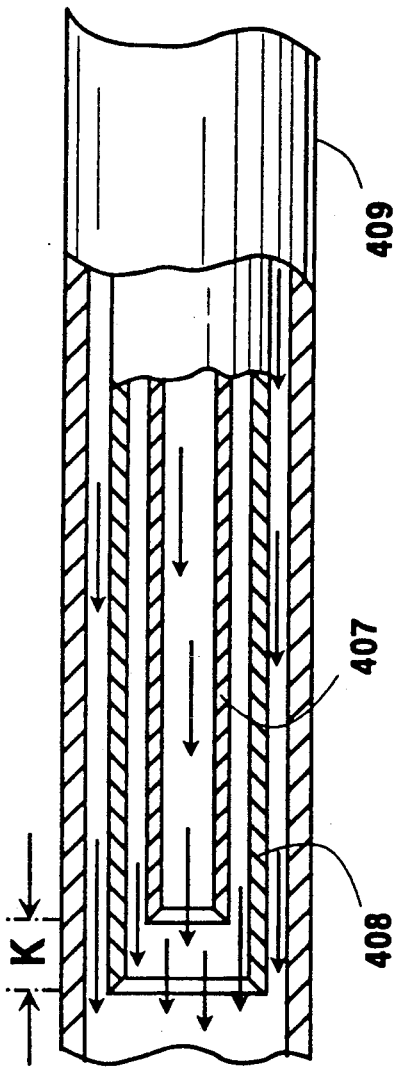
Figure 6:
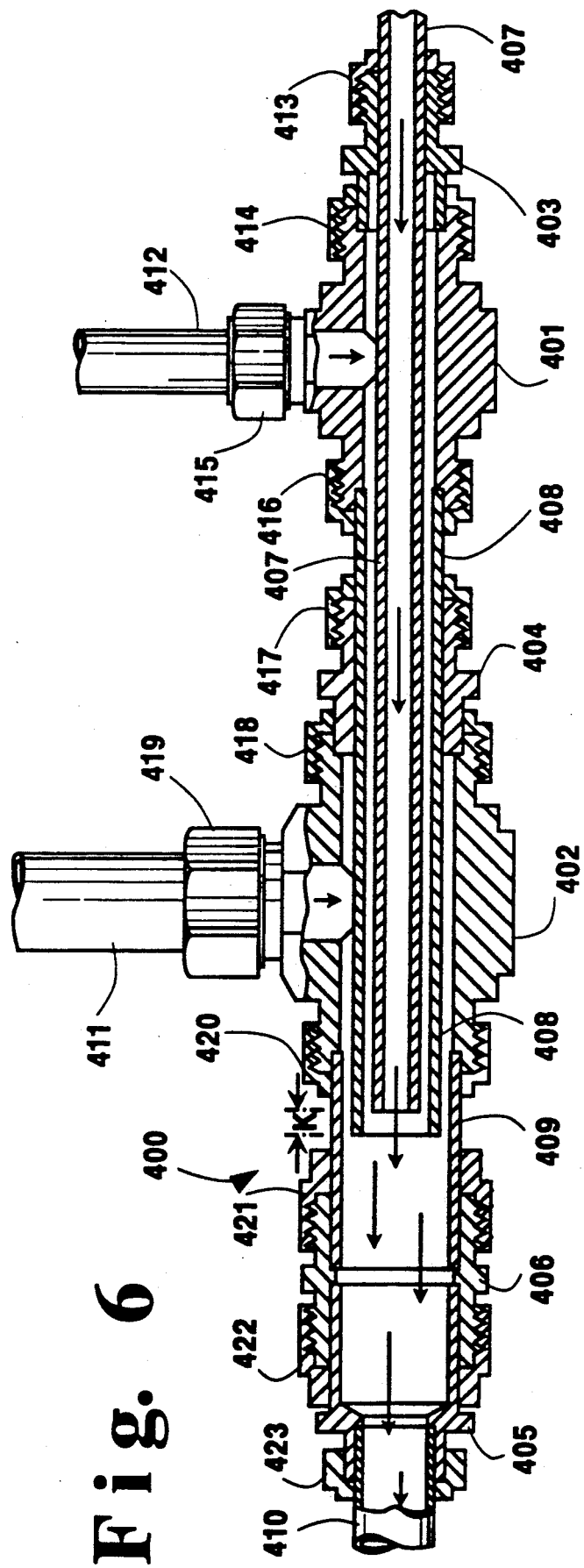

FIG. 6 illustrates a cross-sectional view of a more preferred embodiment of the isocentric low turbulence injector merging means that can be used to effect the desired merging of the non-solvent compressible fluid with the coating composition and then, the merging of that merged and commingling composition with the recycle admixed coating formulation fluid to provide a non-solvent fluid as a core within a surrounding annular layer of coating composition which, in turn, is surrounded with an outer annular layer of recyle admixed coating formulation which results in an improved apparatus for minimizing the precipitation of undesirable solids. Eventually, as this columnar fluid structure traverses along its path, the three fluids intermingle with one another to ultimately form an admixed coating formulation.

Referring to FIG. 6, the merging means assembly 400 comprises two tube fitting union tees 401 and 402, two bored through tube fitting reducers 403 and 404, a tube fitting reducer 405, a tube fitting union 406, tubing 407, 408, 409, 410, 411, and 412, all of which may be any commercially available tubing fittings and tubing such as Swagelok TM tube fittings and tubing.

The bored through reducer 403 is connected to the run of union tee 401 and is secured and retained by back and front ferrule combination and threaded nut 414. Tubing 407 passes through the other end of bored reducer 403 and is secured and retained by ferrules and threaded nut 413. The other end of the run of union tee 401 is connected to the run of union tee 402 through tubing 408, one end of tubing 408 is secured and retained to union 401 by ferrules and threaded nut 416. Tubing 412 is connected to the branch of union tee 401 and is secured and retained by ferrules and threaded nut 415. Tubing 408 is passed through bored through reducer 404, extending through the run of union tee 402, and is secured and retained by ferrules and threaded nut 417 to bored through reducer 404. Bored through reducer 404 is secured and retained to union tee 402 by ferrules and threaded nut 418.

As can be seen in FIG. 6a, the diameter of tubing 407 is smaller than the diameter of tubing 408, and tubing 407 extends to within distance K of the end of tubing 408. Distance K is important in providing the laminar, or near laminar, fluid flow pattern which results in obtaining the objectives of the present invention. The preferable distance, measured in relative diameters of tube 407, is from about 0 to about 2.0 diameters, more preferably, it is from about 0.2 to about 1.0 diameter, and, most preferably, it is about 0.5 diameter. The other end of the run of union tee 402 is connected by tubing 409 to union 406, where this end of tubing 409 is secured and retained by ferrules and threaded nut 420. Tubing 411 is connected to the branch of union tee 402 and is secured and retained by ferrules and threaded nut 419. The end of tubing 409 connected to union 406 is secured and retained to the union by ferrules and threaded nut 421. The other end of union 406 is connected with reducer 405, which is secured and retained to 406 by ferrules and threaded nut 422. Tubing 410 is connected to reducer 405 and is secured and retained by ferrules and threaded nut 423. The other end of tubing 410 is connected to a static mixer (not shown). As can be seen in the Figure, the diameter of tubing 409 is greater than the diameter of tubing 408. The merging means 400 has the outer wall of tubing 407 forming the inner wall of an annulus, the outer wall of which is the inner wall of tubing 408. Likewise, the outer wall of tubing 408 forms the inner wall of an annulus, the outer wall of which is the inner wall of tubing 409. The outer and inner diameters of said tubing 407, 408 and 409 are selected such that the velocity of fluids flowing within tubing 407 and the aforementioned two annuli are all as equal as possible in order for the liquid flows to form streamlines when the flows regimes are in the desired laminar region which are not wavy and minimize mixing in the axial direction, and also to minimize the formation of bubbles or plugs, and the like. Moreover, although the lengths of tubes 407, 408, and 409 within the merging apparatus 400 are not altogether critical to operating the apparatus successfully, optimal results occur when sufficient calming sections are provided such as to ensure fully developed streamlines for dissipating any eddies that may have developed. Generally, the longer the repsective tubes are, the more time the fluids flowing in them will have to desirably more fully develop into the laminar regime thereby helping to acheive the objectives of the present invention. For example, the length of tubing 409 may be any practical length but typically is in the range of from about 7 to about 20 times its outer diameter and more preferably is from about 10 to about 15 times its outer diameter. Correspondingly, the length of tube 408 is generally made approximately equal to the length of tube 409 and positioned such that the outlet end of tube 408 is situated at the approximate midpoint of the length of tube 409. So too, the length of tube 407 in this emobodiment of the present invention is made to be approximately equal to twice the length of tube 409 and is positioned within tube 408 so as to provide the desired distance K discussed above.

As aforementioned, the ends of tubing and shoulders of fittings are coned to provide smooth fluid flow transitions, thereby minimizing the formation of eddies in the flowing liquids.

Figure 9:
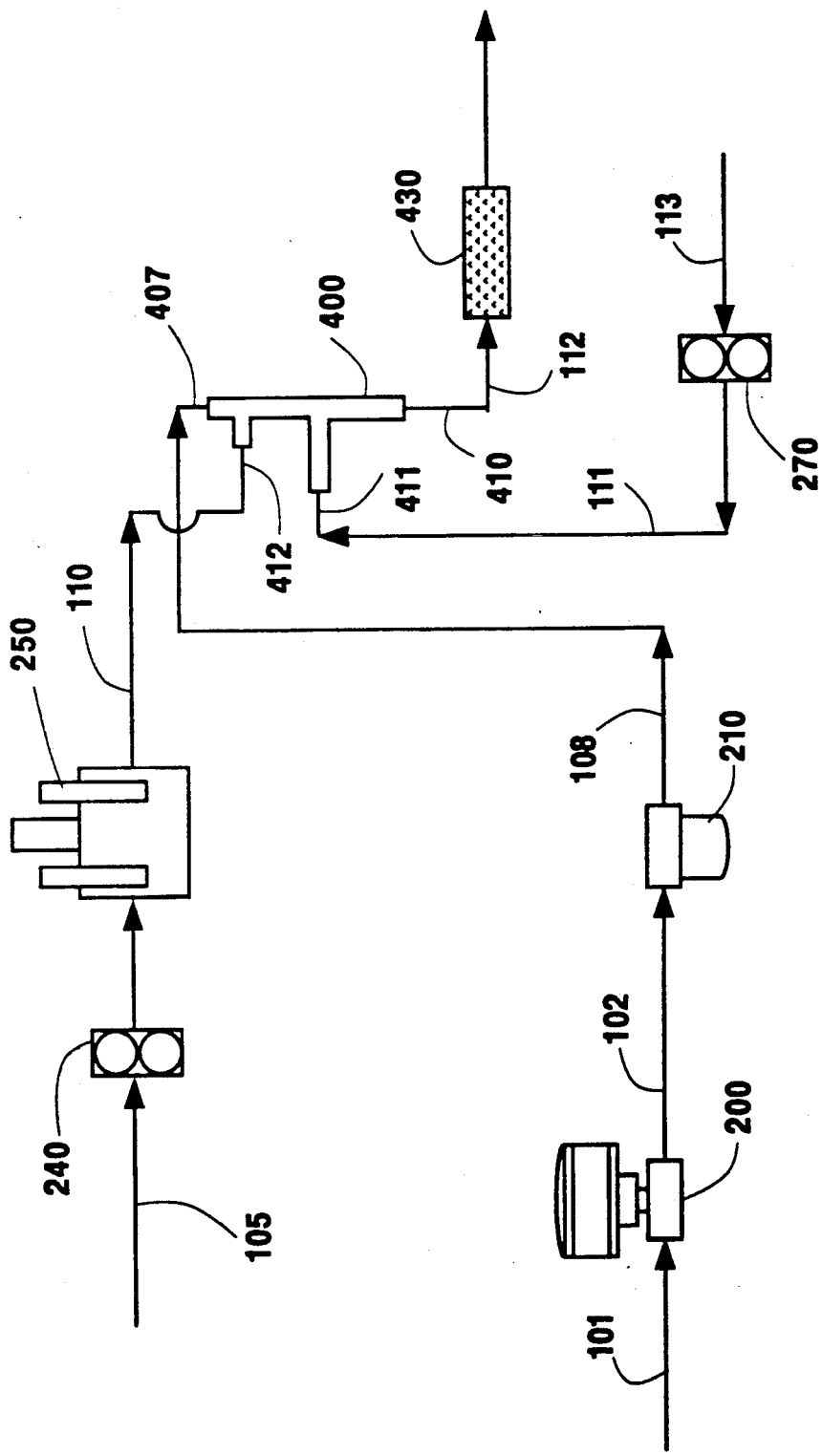

In operation, the merging means 400, as illustrated symbolically and schematically in FIG. 9, in which the same reference numerals are used to identify like elements as illustrated in FIGS. 3 and 6, is continuously supplied recycled coating formulation fluid by pump 270 in laminar flow via tubing 411 which is connected to recycle loop line 111. Tubing 411 connects to the run of union tee 402 (see FIG. 6) wherein said fluid flows in the annulus formed between tubing 408 and tubing 409 (see FIG. 6a). When it exits this annulus, as indicated by the flow arrows shown in FIGS. 6 and 6a, it generally forms an outer annular layer of the recycled admixed coating formulation which captures the annular flow of carbon dioxide/coating composition flowing in laminar flow as it exits tubing 408, as indicated by the flow arrows shown in the Figures. Coating composition is supplied by pump 240 and flows through metering means 250 and line 110 which connects to tubing 412 at injector 400. The supercritical carbon dioxide fluid is supplied by pump 200 and flows via line 102 through mass measuring means 210 and through line 108 which connects to tubing 407 at the injector means 400, preferably but not necessarily in laminar flow, and exits tubing 408 as a central core of fluid, as indicated by the flow arrows as shown in FIG. 6a.

At this position within the injection means 400, there exists radially from the axial center line of the apparatus a central core of non-solvent supercritical carbon dioxide fluid, enveloped within an annulus of coating composition fluid, which is then in turn enveloped within an annulus of recycle admixed coating formulation fluid. With this established flow pattern and with each flowing liquid entity flowing with nearly equal velocity, the carbon dioxide will substantially not come into contact with the outer wall of tubing 409 where the flow velocity is zero and as such is a primary site for the formation of a growing film of precipitated polymer from the coating composition. Such sites tend to increase in size until solid precipitate is dislodged with the potential of such solids plugging the coating apparatus. By providing the aforesaid nearly equal velocities of the components making up the flow field, little, if any, waves will occur at either of the two interfaces and perturbations in the streamlines will be minimal. Accordingly, the film residing between the non-solvent carbon dioxide fluid and the adjacent coating composition fluid will be stable. That is, there will be little or no velocity vectors normal to the axial direction of flow, and consequently there will be little if no contact of the carbon dioxide with the polymer in the coating composition stream, thereby minimizing the precipitation of polymer dissolved in the coating composition fluid at the interfacial surface of the film at the point where the carbon dioxide exits tubing 407 near the termination of tubing 409. What precipitation which may occur will result in only the formation of discrete, well dispersed, fine particles which do not have a tendency to agglomerate into larger particles which could cause plugging to the apparatus.

As this concentric annular arrangement of flowing fluids continues in tubing 409, carbon dioxide diffuses through the interfacial film into the bulk of the coating composition fluid annulus. As the diffusion process continues, as the fluids flow in the axial direction, the carbon dioxide becomes transported to the bulk of the coating composition fluid and is evenly distributed such that homogeneous mixing occurs wherein the system is predominantly in a single-phase state. That is, complete miscibility is approached. As the flowing fluids continue flowing in the axial direction, the diameter of the center core of carbon dioxide gradually diminishes through molecular diffusion through the interfacial film until the central core no longer exists, provided sufficient length is afforded in tubing 409. As the fluids flow from within the apparatus at the point where tubing 408 ends, molecular diffusion of coating composition fluid in the inner annulus occurs across the film interface between this material and the recycle admixed coating formulation fluid flowing in the outer annulus. Such a phenomenon is essential to the desirable mixing process whereby eventually a homogeneous fluid stream is presented to the spraying apparatus.

However, it is also essential that the outer annulus of admixed coating formulation protect the outer wall of the merging apparatus from forming a film of precipitated polymer. As the fluid admixture flows from the larger diameter portion of reducer 406 (see FIG. 6) into the smaller diameter portion, some eddies are formed near the outer wall of the reducer, said eddies do indeed aid the mixing process, which at this point, because the apparatus of the present invention has achieved the objective of minimizing solids formation, we are no longer concerned about plugging, but indeed desire homogenization of the flowing fluid stream, which is accomplished as the fluid flows from injector 400 through tubing 410, which is connected to line 112 from which the fluid admixture flows into static mixer 430 for vigorous mixing (see FIG. 9).

Eddies are also formed when the coating composition supplied in tubing 412 changes direction in tee 401 and when the recycle admixed coating formulation supplied in tubing 411 changes direction in tee 402. However, by providing the aforementioned preferred calming section lengths of tubing 408 and 409 such eddies are allowed to dissipate with the reestablishment of the laminar flow streamlines as these materials flow axially along said lengths, thereby preserving the desirable minimization of precipitation of solids due to the contacting of bubbles, plugs, etc., of the non-solvent carbon dioxide with polymer dissolved in the coating composition fluid.

FIG. 7, in which the same reference numerals are used to identify like elements as shown in FIGS. 3 and 4, illustrates, in an isometric view, an embodiment of the present invention wherein pipe size reduction, followed by out-of-plane ells placed beyond the isocentric low turbulence injector promotes cross-mixing of the laminar flow streamlines, thereby furthering diffusion and flow of the carbon dioxide normal to the flow axis, with the completing of the homogenization of the admixture in a static mixer, which provides the necessary vigorous mixing action. The components of the method and apparatus included in FIG. 7 may be commercially available valves, tubing fittings and tubing, such as Swagelok ™ tube fittings and tubing. Preferably, all components are made of stainless steel.

Figure 7:
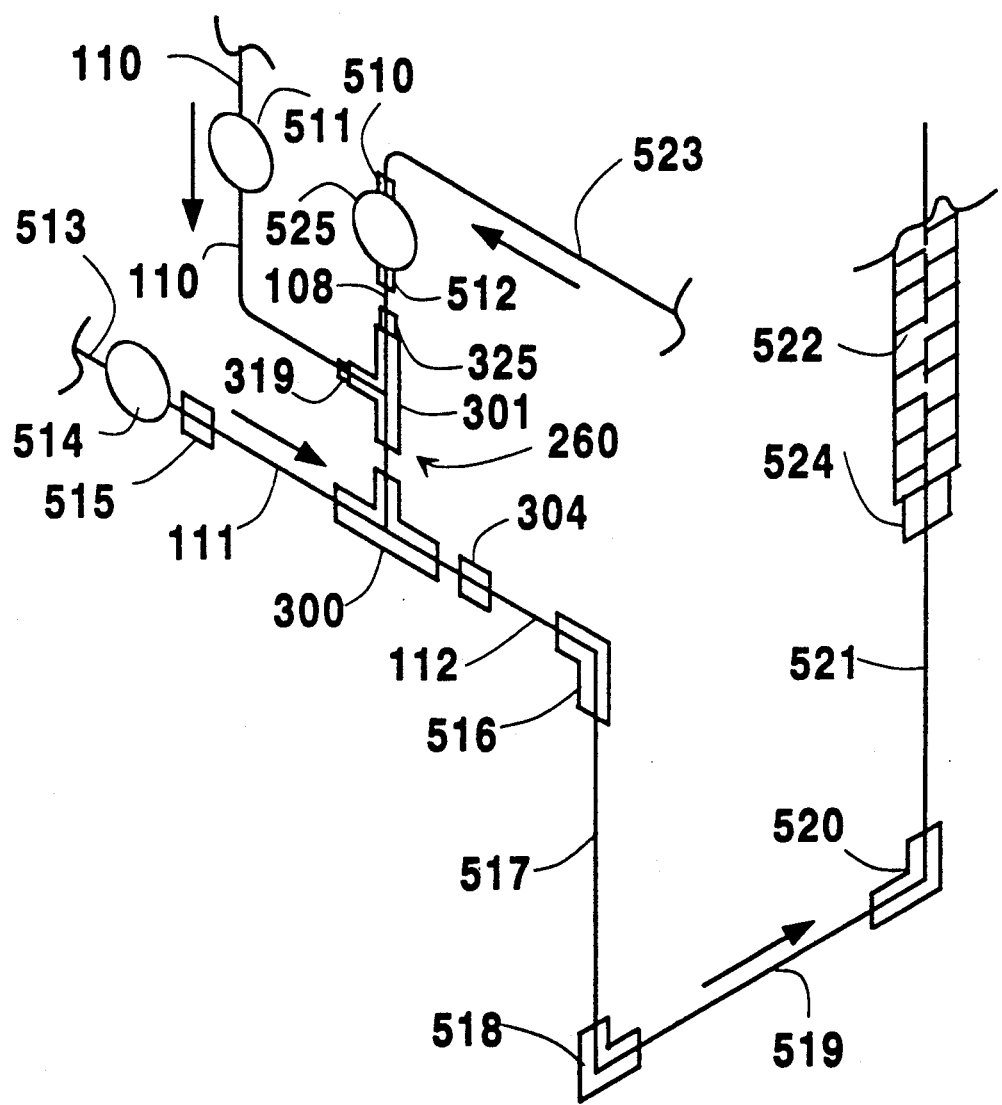

Referring now to FIG. 7, wherein one of several possible dimensional forms of the invention is illustrated, carbon dioxide is continuously supplied from a source (not shown) through line 523, which may be $\frac{1}{8}$ inch diameter stainless steel tubing, and fed into tubing reducer 510, which may be a $\frac{3}{8} \times \frac{1}{4}$ inch reducer, and then flows into $\frac{3}{8}$ inch check valve 525 which is connected to another $\frac{3}{8} \times \frac{1}{4}$ inch tubing reducer 512, and exits said reducer which is connected to $\frac{1}{4}$ inch diameter tubing 108, which forms an integral part of the isocentric injector 260, wherein said tubing enters 260 through reducer 325, which may be a $\frac{1}{2} \times \frac{1}{4}$ inch reducer that is connected to $\frac{1}{2}$ inch tee 301, which is a part of injector 260, wherein the carbon dioxide is injected into coating composition also flowing into injector 260 tee 301. The coating composition is supplied from a source (not shown) through line 110, which may be $\frac{3}{8}$ inch diameter stainless steel tubing, and flows into check valve 511 which is connected to tubing reducer 319, which may be a $\frac{1}{2} \times \frac{3}{8}$ inch reducer, and then flows into tubing union tee 301. Coating composition is supplied from the recycle loop source (not shown) through line 513, which may be $\frac{3}{8}$ inch diameter tubing, and flows into $\frac{3}{8}$ inch check valve 514, where upon exiting the check valve the fluid flows into $\frac{1}{2} \times \frac{3}{8}$ inch reducer 515, and then through $\frac{1}{2}$ inch diameter by about 6 inches long tubing 111 into tubing tee 300, which is an integral part of injector 260. The 6-inch length of tubing 111 provides a calming segment following the reducer 515 that is present to afford reduction in the impact on the flowing fluid of any eddies that may be formed as the said material flows through the reducer and, thereby, allows the redevelopment of the desirable laminar flow streamlines in the flowing fluid. As previously described, it is within tee 300 where the merging of these three aforementioned fluid streams occurs. The now merged fluids, flowing in streamlines in laminar flow, exit tee 300 through $\frac{1}{2} \times \frac{3}{8}$ inch tubing reducer 304, and flows through the about 12-inch long $\frac{3}{8}$ inch diameter tubing section 112 into $\frac{3}{8}$ inch tubing ell 516 which is positioned to provide a 90° change in the flow direction from the horizontal to the vertical direction, then through the about 8-inch long $\frac{3}{8}$ inch diameter tubing section 517, and then through another $\frac{3}{8}$ inch ell 518 which is positioned to provide a 90° change in the flow direction from the vertical to the horizontal direction again, now through the about 8-inch long $\frac{3}{8}$ inch diameter tubing section 519, then through the final $\frac{3}{8}$ inch ell 520 which finally changes the direction of flow 90° from the horizontal to the vertical direction, and then through about 8-inch long $\frac{3}{8}$ inch diameter tubing section into the $\frac{1}{2} \times \frac{3}{8}$ inch tubing reducer 524, and finally the admixed coating formulation mixture flows into the $\frac{1}{2}$ inch static mixer 522, which may be any commercially available static mixer such as available from Kenics Corporation, wherein vigorous mixing action occurs to complete the homogenization of the admixed coating formulation fluid. The series of out-of-plane tubing ells 516, 518, and 520, and the tubing size reduction in tubing 112, 517, and 519 provide desirable moderate axial mixing which aids in the distribution of the carbon dioxide to form the homogeneous, single-phase admixed coating formulation without the undesirable precipitation of dissolved polymer. Although, for convenience, this embodiment of the present invention presents specific sizes for the apparatus, it is apparent that any combination of sizes of apparatus may be utilized provided said combination provides the objectives of the present invention.

In yet another embodiment of the present invention, an automatic solvent flushing method and apparatus may be utilized to flush the carbon dioxide injector tubing with a minimal amount of flush solvent to prevent precipitation induced blockage of the carbon dioxide injection port by dissolving any unexpected incipient solids build-up with an automatically controlled intermittent solvent flush. One such method and apparatus is shown symbolically and schematically in FIG. 8.

Figure 8:
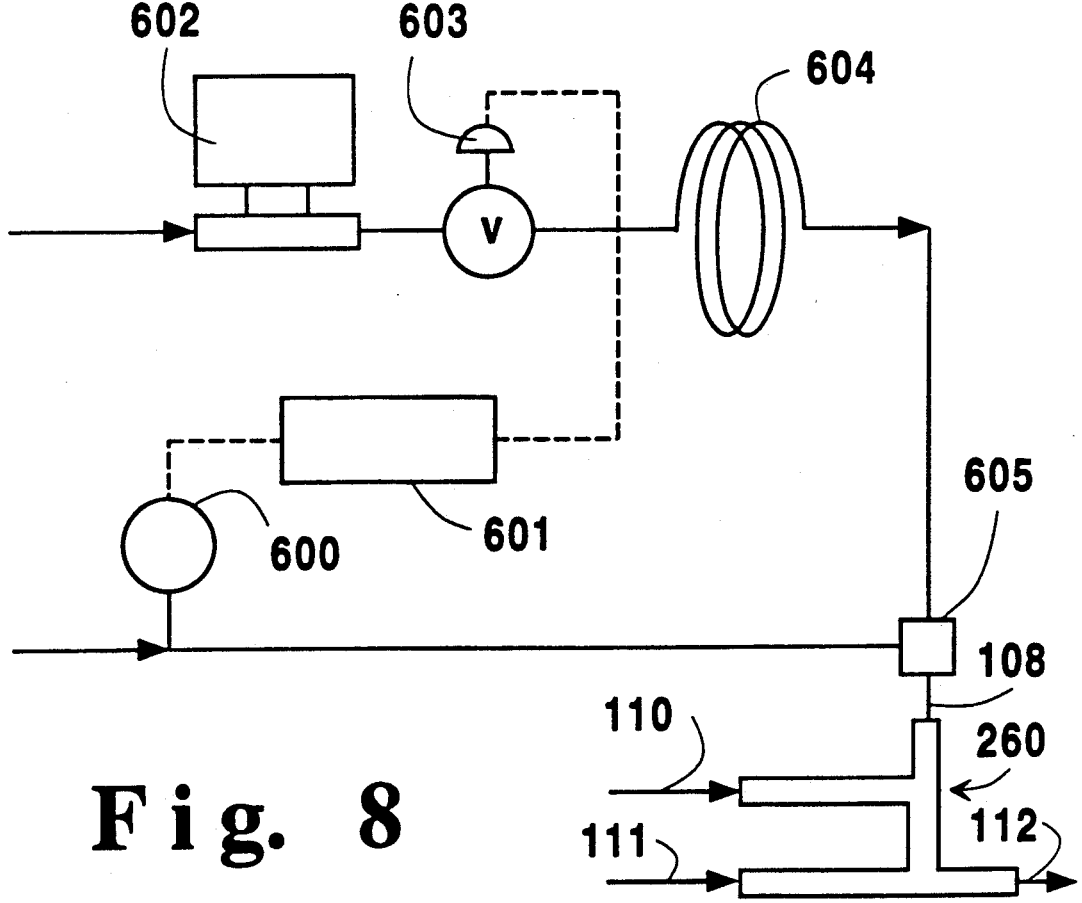

Referring now to FIG. 8, flush solvent fluid, which may be any compound which is a solvent for the polymer(s) or resin(s) contained in the coating composition fluid, but is preferably selected from one or more of those solvents present in the coating composition, is supplied from a convenient source (not shown) to pump 602 which is connected to control valve 603 which is activated by an electric signal from flow switch 600 and time delay relay module 601. Valve 603 is connected to flow restrictor 604, which is then connected to the tee 605. Tee 605 is also supplied carbon dioxide fluid, which is supplied from a convenient source (not shown) to the spray coating apparatus (not shown) where it mixes with the flush solvent fluid and then the admixture flows through line 108 into the iso-centric low turbulence injector 260. Also flowing into injector 260 through line 110 is coating composition fluid, which is supplied from a convenient source (not shown), and coating formulating admixture fluid flowing into the injector through line 111, which is supplied from the spray coating apparatus recycle loop (not shown). The merged fluids exit injector 260 through line 112 and flow, thereby, into what constitutes the circulation loop upstream of mixers, heaters, the spray gun, and the like (not shown), of the spray coating apparatus.

Pumping means 602 may comprise any kind of pump that is capable of pumping the flush solvent at the required pressure and it may be driven by any conventional means. For example, a reciprocating pump, or a gear pump, which are well known to those skilled in the art are quite suitable. Likewise, flow switch 600 may comprise any conventional means which can detect flow and generate an electronic signal, which may be such a device already existing within the spray coating apparatus which is detecting and measuring flow. The flow detected by device 600 generates a signal which is electronically received by a conventional control device (not shown) and when there is no flow sends an electronic signal, which is received by the valve 603, causing the valve to be positioned in its fully open position. Valve 603 may comprise any conventional on/off valve. The rate of flow of the flush solvent is controlled by the differential pressure developed by flow restrictor 604, which may comprise any conventional device, such as, for example, a piece of capillary tubing of prescribed length, which is formed into a coil to conserve space, that provides a drop in the pressure of the flowing flush solvent such that the predetermined prescribed solvent flow rate is achieved. The flow of the flush solvent fluid is stopped when valve 603 is activated to achieve the fully closed position when receiving an electronic signal generated from time delay relay module 601, which activates after a preselected interval of time. Time delay module 601 may comprise any conventional device that accomplishes this purpose.

In operation, the time delay relay module is preset for the selected interval that is long enough to permit adequate flushing to clean the injector, but not so great as to adversely dilute the admixed coating formulation fluid which could affect the quality of the sprayed coating. With the operation of the spray coating apparatus such that it is spraying admixed coating formulation onto the substrate, the iso-centric low turbulence injector 260 is supplied with carbon dioxide through line 108, coating composition through line 110, and recycle admixed coating formulation through line 111. During this period, the flow switch/flow sensor 600 senses uninterrupted flow and no electric signal is generated and sent to cause valve 603 to open, which, therefore, maintains the spray coating apparatus in its normal spraying mode.

However, whenever flow should stop due to the normal operation of the spray coating apparatus unit control system or because of unexpected plugging within the iso-centric low turbulence injector 260, this stoppage is sensed by the flow switch/flow sensor 600 and an electric signal is generated which is transmitted to the on/off valve 603, which in turn such signal causes valve 603 to become fully open and pump 602 to start operation, thereby causing the flush solvent to flow through restrictor 604 and thence into tee 605 where it enters injector 260 through line 108. For purposes of illustration, flush solvent may flow into the injector tube at a nominal rate of about 1.0 cm$^3$/min. The rate selected, or course, is determined by the geometry of the selected flow restrictor 604, the differential pressure drop across said restrictor, the physical properties of the fluid, and the design size of the spray coating apparatus.

After the preset time interval selected in module 601 passes, time delay relay module 601 generates an electric signal which activates on/off valve 603 causing it to become fully closed, which such action also causes pump 602 to cease pumping. Then, continuation of the carbon dioxide flow, either prior to or following the delay time period, will be detected by the flow switch/flow sensor 600, and the system will reset and return to the ready state wherein carbon dioxide is flowing under normal control of the spray coating apparatus.

While preferred forms of the present invention have been described, it should be apparent to those skilled in the art that methods and apparatus may be employed that are different from those shown without departing from the spirit and scope thereof.

The following examples are provided to further illustrate the invention. These examples are intended to be illustrative in nature and are not to be construed as limiting the scope of the invention.

EXAMPLE 1

The following Example illustrates the practice of the present method and apparatus with the injector assembled according to the longitudinal cross-section diagram shown in FIG. 4 and placed in the spray coating apparatus illustrated in FIG. 3 shown symbolically as item 260. The injector device is comprised of the items includes in Table 2, which are shown in FIG. 4.

TABLE 2

| Item No. | Description |
| --- | --- |
| 108 | SS tubing ¼" O.D. × 0.035" wall thickness, with length greater than 8 inches. |
| 110, 111, 112 | SS tubing ⅜" O.D. × 0.035" wall thickness, of optional length. |
| 300, 301 | SS Swagelok ™ ⅜" Union Tee. |
| 302, 303, 307, 310, 318, 323 | SS Swagelok ™ ⅜" Nut. |
| 304, 319 | SS Swagelok ™ ⅜" × ¼" Reducer. |
| 308, 312, 313, 314, 317, 324 | SS Swagelok ™ ¼" Front and Back Ferrules. |
| 309 | SS tubing ¼" O.D. × 0.049 wall thickness, 2" long. |
| 311, 321, 326 | SS Swagelok ™ ⅜" Front and Back Ferrules. |
| 320, 327, 333 | SS Swagelok ™ ⅜" Nut. |
| 325 | SS Swagelok ™ ⅜" × ¼" Bored Reducer. |

The isocentric low turbulence injector 260, as assembled from the components listed in Table 2, was installed in the spray coating apparatus as illustrated in FIG. 3. In the assembly, tubing 108 was positioned at a distance H of about 0.25 inch, as shown in FIGS. 4 and 5. Tubing 108 fed the compressible carbon dioxide to injector 260, with the carbon dioxide, which was being supplied to the apparatus from a cylinder (not shown) at room temperature and at about 800 psig, and then pressured to about 2000 psig by pump 200, a Haskel Model DSF-35 single acting air driven plunger pump, with its set flow rate of about 36 grams per minute being measured by mass flowmeter 210, a Micro Motion Mass Flowmeter, Model DS-006-S-100 to give a true mass flow rate measurement. Coating composition was fed to injector 260 through tubing 110. It was supplied to the apparatus from a tank (not shown) and was pumped up to a pressure of about 1600 psig by metering pump 240, a Zenith, Model HLB-5592 precision gear pump, with the flow rate set and controlled at about 88 grams per minute, which is the preset ratio to the carbon dioxide flow rate, by an electronic signal generated by the mass flowmeter 210 and transmitted to the electronic transducer 220, a Micro Motion remote electronics module, which in turn sent out an electronic signal to electronic ratio controller 230, a Zenith Metering/Control System Z-Drive. Ratio controller 230 contains logic circuitry which was programmed to generate a signal to control the speed of pump 240. In this way the amount of coating composition was controlled to the predetermined ratio of coating composition to carbon dioxide of about 2.44:1 to give 29% by weight of carbon dioxide in the admixed liquid mixture. The coating composition was then fed through measuring device 250, an AW, Model ZHM-02 precision gear meter to measure its actual flow rate. The coating composition was then heated to about 50° C. in a heater (not shown located in line 110), an electric high-pressure paint heater. As these two fluid streams flowed together just above the entrance of the branch of tee 300 into its run, the coating composition formed an annular flow pattern surrounding a flowing center core of supercritical carbon dioxide. This combined flow of fluid then flowed into the run of the tee 300 where it joined the recycle steam of admixed coating formulation fluid being supplied through line 111. This stream cycles through a recirculation loop (not shown) starting where the combined fluids stream exits injector 260 through line 112, with the energy for supplying the circulation provided by pump 270, a Zenith, Model HLB-5592 gear pump, the inlet to which was line 113, which controlled the pressure within the recirculation loop at about 1600 psig. The admixed coating formulation leaving injector 260 and flowing into the recirculation loop was processed in devices (not shown) which mixed the fluid in Kenics static mixers, then heated it to about 60° C. in a Binks high-pressure paint heater, fed it through a sight glass to provide for visual observation of the flowing fluid, then measured its density in a Micro Motion Density meter, and finally feeding it to the airless spray gun, Nordson, Model A7A with circulation, from which the preproportioned, pressurized, heated admixed coating formulation was sprayed onto the substrate. The portion of material not exiting the system through the spray gun flowed through line 113 to pump 270, thus completing the recirculation loop. The loop flow rate was about three times the rate of the combined flow rates of the carbon dioxide and the coating composition. The spray gun was operated for about 5 minutes, with the apparatus observed to be maintaining good control of the coating composition pump and the carbon dioxide flow rate, with the pressure in the recirculation loop being maintained at a constant level of about 1600 psig, unlike the aforementioned observations with the mixing tee used in the apparatus of the prior art, where the pressure in the circulation loop oscillated as did the carbon dioxide feed rate and pressure. Observation of the sight glass showed only small, discrete particles present, there were no large agglomerates, which indicated that no harmful deposits of precipitated polymer were occurring.

Upon completion of the operation, which had a spraying duration of about 5 minutes, the apparatus was shut down and the injector was removed for inspection. The inspection confirmed the observations, as it showed that there was only a very small amount of precipitated polymer deposited in one small area at the knife edge of the carbon dioxide tube exit. It was concluded on the basis of all of the observations that the injector assembly essentially met all of the objectives of the present invention.

The non-compressible coating composition containing a nitrocellulose polymer was prepared by mixing the following materials:
- 3648 grams of Hercules Nitrocellulose wet with 2-propanol, which contains 70% non-volatile nitrocellulose;
- 5680 grams of Reichhold BECKOSOL Synthetic Resin Solution C09195-02, a non-oxidizing short coconut oil alkyd dissolved in methyl amyl ketone, which contains 75% non-volatile alkyd polymer;
- 688 grams of dioctylphthalate plasticizer;
- 4784 grams of methyl amyl ketone solvent;
- 1200 grams of normal butanol solvent.

The coating composition contained about 42.6%, by weight of nonvolatile polymer solids. It had a viscosity of about 1510 centipoise, and a specific gravity of about 0.9784.

EXAMPLE 2

The same apparatus, coating composition, and spray mixture were used as in Example 1. In this Example, the feed rates of both the carbon dioxide and the coating composition were varied over a range of about 50 to 250 grams per minute for the carbon dioxide and of about 122 to 612 grams per minute for the coating composition, with the carbon dioxide content of the admixture of these two flows being held constant at about 29% by weight. For the series of carbon dioxide flow rates shown in Table 3, Reynolds numbers were calculated, and these and the related flow regimes are likewise shown in this table. The flow regime is defined to be laminar when the Reynolds number is less than or equal to 2000, turbulent when the number is 3000 or greater, and in the transition region for values between 2000 and 3000.

TABLE 3

| $CO_2$ Feed Rate, gm/min | 50 | 100 | 200 | 250 |
|---|---|---|---|---|
| Reynolds Number | 2150 | 4635 | 9270 | 11590 |
| $CO_2$ Flow Regime | Trans | Turb | Turb | Turb |

Calculations further show that the laminar regime for the carbon dioxide flow was at a flow rate of about 43 grams per minute. The small diameter, ⅛ inch, of the carbon dioxide feed injector tube and its low viscosity of about 0.1 centipoise mainly contributed to the relatively high Reynolds numbers for these flows. For all of the above carbon dioxide flow rates, the coating composition flow rates were calculated to be in the laminar regime, mainly because of the high viscosity of said material. Likewise, when combined with the admixed coating formulation recycle flow, the total admixture flow rate was calculated to be in the laminar regime. Observations made during runs made within the above range, showed that some plugging problems persisted at the higher carbon dioxide feed rates. Although it was not fully understood, said results may well be attributed to the carbon dioxide flowing in the turbulent regime.

EXAMPLE 3

The same apparatus, procedure, coating composition, and spray mixture was used as in Example 2, except that the size of the iso-centric low turbulence injector 260, as shown in FIG. 4, was modified to increase the size of the carbon dioxide injector tube to ¼ inch, with the rest of the components sized-up appropriately, to provide laminar flow of the carbon dioxide at the lower flow rates. The results are presented in Table 4.

TABLE 4

| $CO_2$ Feed Rate, gm/min | 50 | 100 | 200 | 250 |
|---|---|---|---|---|
| Reynolds Number | 970 | 1940 | 3880 | 4850 |
| $CO_2$ Flow Regime | Lam | Lam | Turb | Turb |

In this case, the carbon dioxide feed rate at which the transient flow regime occurred was at about 105 grams per minute, and became turbulent at about 155 grams per minute. Specific observations made during runs, when the carbon dioxide feeds were set at about 125 grams per minute and at about 240 grams per minute, were that this scale of the injector worked very well in that there was no sign of plugging in the injector. At the lower carbon dioxide feed rate, its Reynolds number was calculated to be 2425 for which said flow was in the lower end of the transient regime, and at the higher feed rate it was in the turbulent regime. The observed improvement in operation over that experienced in Examples 1 and 2, may well be attributed to the lower Reynolds number for the present injector assembly. For example, they are less than one-half the values for equivalent carbon dioxide feed rates.

EXAMPLE 4

The following Example illustrates the practice of the preferred embodiment of the present method and apparatus with the apparatus assembled according to the longitudinal cross-section diagram shown in FIG. 6, and placed within the spray coating apparatus, as illustrated in FIG. 9, and using the same procedure, coating composition, and spray mixture as was used in Example 2.

Injector 400, as shown in FIG. 6, is comprised of the items included in Table 5.

TABLE 5

| Item No. | Description |
| --- | --- |
| 401 | SS Swagelok ™ ¾" Union Tee. |
| 402 | SS Swagelok ™ 1" Union Tee. |
| 403 | SS Swagelok ™ ½" × ¾" Bored Reducer. |
| 404 | SS Swagelook ™ ¾" × 1" Bored Reducer. |
| 405 | SS Swagelok ™ ½" × 1" Reducer. |
| 406 | SS Swagelok ™ Union. |
| 407, 410 | SS tubing ½" O.D. × 0.049" wall thickness, 17¼" long. |
| 408, 412 | SS tubing ¾" O.D. × 0.065" wall thickness, 13" long. |
| 409, 411 | SS tubing 1" O.D. × 0.083" wall thickness, 10¼" long. |
| 413, 423 | SS Swagelok ™ ½" Nut. |
| 414, 415, 416, 417 | SS Swagelok ™ ¾" Nut. |
| 418, 419, 420, 421, 422 | SS Swagelok ™ 1" Nut. |

In the assembly, the cone downstream end of tubing 407 was positioned in the run of tee 402, in the direction of flow, 5-11/16" beyond the center line of the branch of tee 402. The downstream end of tubing 408 was positioned ¼" beyond the cone end of tubing 407 (Distance K in the FIG. 6a). The isocentric low turbulence injector 400 was installed vertically in the spray coating apparatus such that the flow of the carbon dioxide was in the downward direction.

Referring now to FIG. 9, injector 400, as shown in the figure, was installed in a vertical configuration. The carbon dioxide feed line 108 was connected to tubing 407 as it entered injector 400, the coating composition feed line 110 was connected to tubing 412 as it entered the injector, and the recycle line 111 was connected to tubing 411 as it entered injector 400. The carbon dioxide feed was supplied from a cylinder (not shown), flowed at a rate of about 267 grams per minute through line 101, was pressured up to about 2000 psig by pump 200, flowed through line 102 and then through mass metering means 210, through line 108 to tubing 407, through which it was injected into injector 400 in the transition regime (a condition between laminar and turbulent regimes) with a Reynolds number of about 2770. The coating composition was supplied from a feed tank (not shown) by line 105 and flowed at a feed rate of about 590 grams per minute into pump 240 wherein it was pressured up to about 1500 psig, flowed through metering means 250, then flowed through line 110 to tubing 412, through which it was introduced into injector 400 in the laminar flow regime with a Reynolds number of about 2. The recycle admixed coating formulation was supplied by line 113 to pump 270 which maintained the flow rate in the circulation loop (not completely shown) at about 2500 grams per minute while maintaining the pressure at about 1490 psig, with the pump effluent flowing through line 111 to tubing 411 wherein it was introduced into injector 400 while flowing in the laminar regime with a Reynolds number of about 120. The temperature of the material in the circulation loop was maintained at about 60° C. by heating means (not shown) contained within the said loop. Other devices, not shown, provided operating control of the spray coating apparatus, including the proportioning of the carbon dioxide feed and the coating composition feed to the prescribed ratio, which was about 2.21:1 coating composition to carbon dioxide. With this ratio, the admixed coating formulation had a carbon dioxide content of about 31% by weight. The coating formulation and carbon dioxide mixture exiting injector 400 through tubing 410 flowed through line 112 into static mixer 430 where vigorous mixing action produced a homogeneous admixture which then flowed through the heating and other means and was sprayed onto the substrate by the spray gun (none of these devices are shown in FIG. 9).

During period of spraying carried out, which was considerable, no significant fluctuation in feed rate nor pressure was observed. The sight glass visual observations showed only fine, discrete particles of precipitated polymer with no evidence of a tendency to agglomerate. Upon completion of the run, the injector was removed from the spray coating apparatus. After disassembly, inspection of the parts of the device showed no evidence of any deposits, specifically no evidence of a film of polymer on the walls of the components of the injector means. This is especially significant considering that the carbon dioxide fluid was flowing in the transition regime with a Reynolds number of about 2770, which was very close to the threshold of turbulent flow which occurs at about a Reynolds number of 3000.

What is claimed is:

1. A method for substantially preventing the precipitation of one or more dissolved solids contained within a first fluid when being added to a second fluid containing at least one non-solvent component for the one or more dissolved solids comprising:
    a) passing the first fluid containing the one or more dissolved solids through a first conduit as a laminar flow as determined by its Reynolds number; and
    b) introducing the second fluid containing the at least one non-solvent component as a core of fluid within the first fluid such that the second fluid is completely surrounded by the first fluid, wherein the second fluid is introduced having a Reynolds number of less than about 3000.

2. The method of claim 1, wherein the Reynolds number of the first fluid passing through the first conduit is less than about 2000.

3. The method of claim 1, wherein the Reynolds number of the second fluid introduced as a core of fluid within the first fluid is less than about 2000.

4. The method of claim 1, wherein the second fluid is introduced into the first fluid by a second conduit which is positioned within the first conduit.

5. The method of claim 4, wherein the second conduit is concentrically positioned within the first conduit.

6. The method of claim 4, wherein the first and/or second conduits have a circular cross-section.

7. The method of claim 4, wherein the first conduit has inner and outer walls and the second conduit has inner and outer walls and an annulus is formed by the outer walls of the second conduit and the inner walls of the first conduit and in which annulus the first fluid is flowing.

8. The method of claim 4, wherein the second conduit has an outlet end through which the second fluid is introduced into the first fluid and wherein the inner wall of said end is tapered to form an outlet angle in the range of from about 15° to about 60°.

9. The method of claim 8, wherein the outlet angle is in the range of from about 15° to about 30°.

10. The method of claim 4, wherein at least a portion of the first conduit is a component of a 90° tee which 90° contains a branch and a run perpendicularly disposed to one another and wherein the at least a portion of the first conduit is the branch of said 90° tee such that the first fluid flows perpendicularly from the branch into the run of the 90° tee.

11. The method of claim 10, wherein the second conduit is positioned within the branch of the 90° tee and said second conduit has an outlet end through which the second fluid is introduced into the first fluid and wherein the distance from said outlet end to the inner wall of the branch of said 90° tee is from about 0 to about 2 diameters based on the outer diameter of the second conduit.

12. The method of claim 11, wherein the distance from said outlet end to the inner wall of the branch of said 90° tee is from about 0.5 to about 1.5 diameters.

13. The method of claim 10, wherein an admixture of the first and second fluids flows through the run of the 90° tee.

14. The method of claim 1, wherein the first fluid contains dissolved nitrocellulose.

15. The method of claim 1, wherein the second fluid comprises one or more supercritical fluids.

16. The method of claim 15, wherein the supercritical fluid is supercritical carbon dioxide.

17. The method of claim 1, wherein the flow velocity of each of the fluids is substantially the same.

18. A method for substantially preventing the precipitation of one or more dissolved solids contained within a first fluid when being added to a second fluid containing at least one non-solvent component for the one or more dissolved solids comprising:
   a) passing the first fluid containing the one or more dissolved solids through a first conduit as a laminar flow as determined by its Reynolds number;
   b) introducing the second fluid containing the at least one non-solvent component as a core of fluid within the first fluid such that the second fluid is completely surrounded by the first fluid, wherein the second fluid is introduced having a Reynolds number of less than about 3000 to form a first columnar array of the first and second fluids flowing at a Reynolds number of less than about 3000; and
   c) introducing the first columnar array of fluids as a core of fluids within an admixture of the first and second fluids flowing in laminar flow as determined by its Reynolds number so as to form a second columnar array of fluids comprising an inner core of the second fluid, a middle annularly-shaped layer of the first fluid surrounding and in intimate contact with the second fluid, and an outer annularly-shaped layer of the admixture of the first and second fluids surrounding and in intimate contact with the first fluid.

19. The method of claim 18, wherein the Reynolds number of the first fluid passing through the first conduit is less than about 2000.

20. The method of claim 18, wherein the Reynolds number of the second fluid introduced as a core of fluid within the first fluid is less than about 2000.

21. The method of claim 18, wherein the admixture of the first and second fluids is flowing at a Reynolds number of less than about 2000.

22. The method of claim 18, wherein the second fluid is introduced into the first fluid by a second conduit which is positioned within the first conduit and wherein the first conduit is positioned within a third conduit through which the admixture of the first and second fluids flow.

23. The method of claim 22, wherein one or more of the conduits is concentrically positioned within the other.

24. The method of claim 22, wherein one or more of the conduits has a circular cross-section.

25. The method of claim 22, wherein the first conduit has inner and outer walls and the second conduit has inner and outer walls and an annulus is formed by the outer walls of the second conduit and the inner walls of the first conduit and in which annulus the first fluid is flowing.

26. The method of claim 25, wherein the third conduit has inner and outer walls and the admixture of the first and second fluids flows in the annulus formed by the inner walls of the third conduit and the outer walls of the first conduit.

27. The method of claim 22, wherein the second conduit has an outlet end through which the second fluid is introduced into the first fluid and wherein the inner wall of said end is tapered to form an outlet angle in the range of from about 15° to about 60°.

28. The method of claim 27, wherein the outlet angle is in the range of from about 15° to about 30°.

29. The method of claim 22, wherein the first conduit has an outlet end through which the first columnar array of fluids is introduced into the third conduit containing the admixture of the first and second fluids and wherein the inner wall of said end is tapered to form an outlet angle in the range of from about 15° to about 60°.

30. The method of claim 29, wherein the outlet angle is in the range of from about 15° to about 30°.

31. The method of claim 18, wherein the respective flow velocities of the first fluid, the second fluid, and the admixture of fluids are substantially equal.

32. The method of claim 22, wherein the second conduit has an outlet end through which the second fluid is introduced into the first fluid and the first conduit has an outet end through which the the first columnar array of fluids is introduced into the third conduit containing the admixture of the first and second fluids and wherein the distance between the outlet end of the second conduit to the outlet end of the first conduit is from about 0 to about 2.0 diameters, based on the outer diameter of the second conduit.

33. The method of claim 32, wherein the distance is from about 0.2 to about 1.0 diameter, based on the outer diameter of the second conduit.

34. The method of claim 18, wherein the first fluid contains dissolved nitrocellulose.

35. The method of claim 18, wherein the second fluid comprises one or more supercritical fluids.

36. The method of claim 35, wherein the supercritical fluid is supercritical carbon dioxide.

37. An apparatus for adding one or more fluids to another while substantially preventing the precipitation of one or more dissolved solids contained within a first fluid when being added to a second fluid containing at least one non-solvent component for the one or more dissolved solids comprising:
  a) means for passing the first fluid containing the one or more dissolved solids through a first conduit as a laminar flow as determined by its Reynolds number; and
  b) means for introducing the second fluid containing the at least one non-solvent component as a core of fluid within the first fluid such that the second fluid is completely surrounded by the first fluid, wherein the second fluid is introduced having a Reynolds number of less than about 3000.

38. The apparatus of claim 37, wherein the second fluid is introduced into the first fluid by a second conduit which is positioned within the first conduit.

39. The apparatus of claim 38, wherein the second conduit is concentrically positioned within the first conduit.

40. The apparatus of claim 38, wherein the first and/or second conduits have a circular cross-section.

41. The apparatus of claim 38, wherein the second conduit has an outlet end through which the second fluid is introduced into the first fluid and wherein the inner wall of said end is tapered to form an outlet angle in the range of from about 15° to about 60°.

42. The apparatus of claim 41, wherein the outlet angle is in the range of from about 15° to about 30°.

43. The apparatus of claim 38, wherein at least a portion of the first conduit is a component of a 90° tee which 90° contains a branch and a run perpendicularly disposed to one another and wherein the at least a portion of the first conduit is the branch of said 90° tee such that the first fluid flows perpendicularly from the branch into the run of the 90° tee.

44. The apparatus of claim 43, wherein the second conduit is positioned within the branch of the 90° tee and said second conduit has an outlet end through which the second fluid is introduced into the first fluid and wherein the distance from said outlet end to the inner wall of the branch of said 90° tee is from about 0 to about 2 diameters based on the outer diameter of the second conduit.

45. The apparatus of claim 44, wherein the distance from said outlet end to the inner wall of the branch of said 90° tee is from about 0.5 to about 1.5 diameters.

46. An apparatus for adding one or more fluids to another while substantially preventing the precipitation of one or more dissolved solids contained within a first fluid when being added to a second fluid containing at least one non-solvent component for the one or more dissolved solids comprising:
  a) means for passing the first fluid containing the one or more dissolved solids through a first conduit as a laminar flow as determined by its Reynolds number;
  b) means for introducing the second fluid containing the at least one non-solvent component as a core of fluid within the first fluid such that the second fluid is completely surrounded by the first fluid, wherein the second fluid is introduced having a Reynolds number of less than about 3000 to form a first columnar array of the first and second fluids flowing at a Reynolds number of less than about 3000; and
  c) means for introducing the first columnar array of fluids as a core of fluids within an admixture of the first and second fluids flowing in laminar flow as determined by its Reynolds number so as to form a second columnar array of fluids comprising an inner core of the second fluid, a middle annularly-shaped layer of the first fluid surrounding and in intimate contact with the second fluid, and an outer annularly-shaped layer of the admixture of the first and second fluids surrounding and in intimate contact with the first fluid.

47. The apparatus of claim 46, wherein the second fluid is introduced into the first fluid by a second conduit which is positioned within the first conduit and wherein the first conduit is positioned within a third conduit through which the admixture of the first and second fluids flow.

48. The apparatus of claim 47, wherein one or more of the conduits is concentrically positioned within the other.

49. The apparatus of claim 47, wherein one or more of the conduits has a circular cross-section.

50. The apparatus of claim 47, wherein the second conduit has an outlet end through which the second fluid is introduced into the first fluid and wherein the inner wall of said end is tapered to form an outlet angle in the range of from about 15° to about 60°.

51. The apparatus of claim 50, wherein the outlet angle is in the range of from about 15° to about 30°.

52. The apparatus of claim 47, wherein the first conduit has an outlet end through which the first columnar array of fluids is introduced into the third conduit containing the admixture of the first and second fluids and wherein the inner wall of said end is tapered to form an outlet angle in the range of from about 15° to about 60°.

53. The apparatus of claim 52, wherein the outlet angle is in the range of from about 15° to about 30°.

54. The apparatus of claim 47, wherein the second conduit has an outlet end through which the second fluid is introduced into the first fluid and the first conduit has an outlet end through which the the first columnar array of fluids is introduced into the third conduit containing the admixture of the first and second fluids and wherein the distance between the outlet end of the second conduit to the outlet end of the first conduit is from about 0 to about 2.0 diameters, based on the outer diameter of the second conduit.

55. The apparatus of claim 54, wherein the distance is from about 0.2 to about 1.0 diameter, based on the outer diameter of the second conduit.

* * * * *

UNITED STATES PATENT AND TRADEMARK OFFICE
CERTIFICATE OF CORRECTION

PATENT NO. : 5,105,843
DATED : April 21, 1992
INVENTOR(S) : James Andrew Condron; Alex Chia-Huei Kuo It is certified that error appears in the above-identified patent and that said Letters Patent is hereby corrected as shown below:

Column 6, line 21, "Examples of application Ser. No. 218,910" should read --Examples of the 218,910 Application--.

Column 7, line 9, "carbon dioxide 180° mixing tee" should read --carbon dioxide feed injection point of a horizontally positioned 180° mixing tee--.

Column 7, line 16, "int he" should read --in the--.

Column 12, line 9, "Yet" should read --yet--.

Column 19, line 44, "Produce" should read --produce--.

Column 22, line 41, "sue" shoud read --use--.

Column 24, line 54, "Purposes" should read --purposes--.

Signed and Sealed this

Third Day of August, 1993

Attest:

MICHAEL K. KIRK

*Attesting Officer*     Acting Commissioner of Patents and Trademarks